US012731593B2

(12) United States Patent
Wang et al.

(10) Patent No.: US 12,731,593 B2
(45) Date of Patent: Sep. 8, 2026

(54) METHOD AND APPARATUS FOR NEURAL NETWORK-BASED AUDIO ENCODING USING SUBBAND DECOMPOSITION

(71) Applicant: Tencent Technology (Shenzhen) Company Limited, Shenzhen (CN)

(72) Inventors: Meng Wang, Shenzhen (CN); Shan Yang, Shenzhen (CN); Qingbo Huang, Shenzhen (CN); Yuyong Kang, Shenzhen (CN); Yupeng Shi, Shenzhen (CN); Wei Xiao, Shenzhen (CN); Shidong Shang, Shenzhen (CN); Dan Su, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 175 days.

(21) Appl. No.: 18/640,724

(22) Filed: Apr. 19, 2024

(65) Prior Publication Data

US 2024/0265929 A1    Aug. 8, 2024

Related U.S. Application Data

(63) Continuation of application No. PCT/CN2023/088638, filed on Apr. 17, 2023.

(30) Foreign Application Priority Data

Jun. 15, 2022 (CN) ........................ 202210681365.X

(51) Int. Cl.
*G10L 19/032* (2013.01)
*G10L 19/02* (2013.01)
(Continued)

(52) U.S. Cl.
CPC ........ *G10L 19/032* (2013.01); *G10L 19/0204* (2013.01); *G10L 21/038* (2013.01); *G10L 25/30* (2013.01)

(58) Field of Classification Search
CPC . G10L 19/032; G10L 19/0204; G10L 21/038; G10L 25/30
See application file for complete search history.

(56) References Cited

U.S. PATENT DOCUMENTS 5,765,127 A    6/1998 Nishiguchi et al.
9,443,534 B2 *    9/2016 Gao ...................... G10L 19/022
(Continued)

FOREIGN PATENT DOCUMENTS

CN 102158692 A 8/2011
CN 108417219 A 8/2018
(Continued)

OTHER PUBLICATIONS

Li, Kehuang, and Chin-Hui Lee. "A deep neural network approach to speech bandwidth expansion." 2015 IEEE international conference on acoustics, speech and signal processing (ICASSP). IEEE, 2015.*
(Continued)

*Primary Examiner* — Shaun Roberts
(74) *Attorney, Agent, or Firm* — Sughrue Mion, PLLC

(57) ABSTRACT

An audio processing method and apparatus, including decomposing an audio signal into a low-frequency subband signal and a high-frequency subband signal, obtaining a low-frequency feature of the low-frequency subband signal, obtaining a high-frequency feature of the high-frequency subband signal, feature dimensionality of the high-frequency feature being lower than feature dimensionality of the low-frequency feature, performing quantization encoding on the low-frequency feature to obtain a low-frequency
(Continued)

bitstream of the audio signal, and performing quantization encoding on the high-frequency feature to obtain a high-frequency bitstream of the audio signal.

20 Claims, 10 Drawing Sheets

(51) Int. Cl.
*G10L 21/038* (2013.01)
*G10L 25/30* (2013.01)

(56) References Cited

U.S. PATENT DOCUMENTS

| | | | | |
|---|---|---|---|---|
| 9,818,419 | B2 * | 11/2017 | Atti | G10L 21/038 |
| 11,985,179 | B1 * | 5/2024 | Tacer | G10L 21/00 |
| 2010/0063812 | A1 * | 3/2010 | Gao | G10L 19/002 704/230 |
| 2014/0074489 | A1 * | 3/2014 | Chong | G10L 19/04 704/500 |
| 2016/0255452 | A1 * | 9/2016 | Nowak | G10L 19/008 381/17 |
| 2017/0188175 | A1 * | 6/2017 | Oh | H04S 3/008 |
| 2018/0277097 | A1 * | 9/2018 | Li | G10L 15/22 |
| 2019/0258917 | A1 * | 8/2019 | Chai | G06N 3/084 |
| 2021/0005209 | A1 * | 1/2021 | Beack | G06N 3/0455 |
| 2021/0166705 | A1 * | 6/2021 | Chang | G10L 25/30 |
| 2023/0016637 | A1 * | 1/2023 | Schmidt | G06N 3/045 |

FOREIGN PATENT DOCUMENTS

| | | | |
|---|---|---|---|
| CN | 110556123 | A | 12/2019 |
| CN | 113470667 | A | 10/2021 |
| CN | 113903345 | A | 1/2022 |
| CN | 115116456 | A | 9/2022 |
| WO | 2016/023322 | A1 | 2/2016 |

OTHER PUBLICATIONS

J. Su, Y. Wang, A. Finkelstein and Z. Jin, “Bandwidth Extension is All You Need,” ICASSP 2021—2021 IEEE International Conference on Acoustics, Speech and Signal Processing (ICASSP), Toronto, ON, Canada, 2021, pp. 696-700, doi: 10.1109/ICASSP39728.2021.9413575.*

Schmidt, Konstantin, and Bernd Edler. “Blind bandwidth extension based on convolutional and recurrent deep neural networks.” 2018 IEEE International Conference on Acoustics, Speech and Signal Processing (ICASSP). IEEE, 2018.*

Office Action issued Jun. 15, 2024 in Chinese Application No. 202210681365.X.

International Search Report for PCT/CN2023/088638 dated Aug. 3, 2023 (PCT/ISA/210).

Written Opinion for PCT/CN2023/088638 dated Aug. 3, 2023 (PCT/ISA/237).

* cited by examiner

METHOD AND APPARATUS FOR NEURAL NETWORK-BASED AUDIO ENCODING USING SUBBAND DECOMPOSITION

CROSS-REFERENCE TO RELATED APPLICATIONS

This application is a continuation application of International Application No. PCT/CN2023/088638 filed on Apr. 17, 2023, which claims priority to Chinese Patent Application No. 202210681365.X filed with the China National Intellectual Property Administration on Jun. 15, 2022, the disclosures of each being incorporated by reference herein in their entireties.

FIELD

The disclosure relates to the field of data processing technologies, and in particular, to an audio processing method and apparatus, an electronic device, a computer-readable storage medium, and a computer program product.

BACKGROUND

An audio codec technology is a core technology in a communication service including a remote audio/video call. A speech encoding technology is briefly a technology of using a few network bandwidth resources to transmit speech information as much as possible. From the perspective of the Shannon information theory, speech encoding is a type of source encoding. An objective of the source encoding is to compress, on an encoder side to a maximum extent, an amount of data of information that needs to be transmitted, to eliminate redundancy in the information, and also enable a decoder side to restore the information in a lossless (or approximately lossless) manner.

However, no effective solution for improving audio encoding efficiency while ensuring audio quality is available in the related art.

SUMMARY

Some embodiments provide an audio processing method and apparatus, an electronic device, a computer-readable storage medium, and a computer program product, to improve audio encoding efficiency while ensuring audio quality.

Some embodiments provide an audio processing method, including: decomposing an audio signal into a low-frequency subband signal and a high-frequency subband signal; obtaining a low-frequency feature of the low-frequency subband signal; obtaining a high-frequency feature of the high-frequency subband signal, feature dimensionality of the high-frequency feature being lower than feature dimensionality of the low-frequency feature; performing quantization encoding on the low-frequency feature to obtain a low-frequency bitstream of the audio signal; and performing quantization encoding on the high-frequency feature to obtain a high-frequency bitstream of the audio signal.

Some embodiments provide an audio processing apparatus, including: at least one memory configured to read store program code; and at least one processor configured to read the program code and operate as instructed by the program code, the program code comprising: decomposition code configured to cause at least one of the at least one processor to decompose an audio signal into a low-frequency subband signal and a high-frequency subband signal; feature extraction code configured to cause at least one of the at least one processor to obtain a low-frequency feature of the low-frequency subband signal; high-frequency analysis code configured to cause at least one of the at least one processor to obtain a high-frequency feature of the high-frequency subband signal, feature dimensionality of the high-frequency feature being lower than feature dimensionality of the low-frequency feature; and encoding code configured to cause at least one of the at least one processor to perform quantization encoding on the low-frequency feature to obtain a low-frequency bitstream of the audio signal, and perform quantization encoding on the high-frequency feature to obtain a high-frequency bitstream of the audio signal.

Some embodiments provide a non-transitory computer-readable storage medium, storing computer code which, when executed by at least one processor, causes the at least one processor to at least: decompose an audio signal into a low-frequency subband signal and a high-frequency subband signal; obtain a low-frequency feature of the low-frequency subband signal; obtain a high-frequency feature of the high-frequency subband signal, feature dimensionality of the high-frequency feature being lower than feature dimensionality of the low-frequency feature; perform quantization encoding on the low-frequency feature to obtain a low-frequency bitstream of the audio signal; and perform quantization encoding on the high-frequency feature to obtain a high-frequency bitstream of the audio signal.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
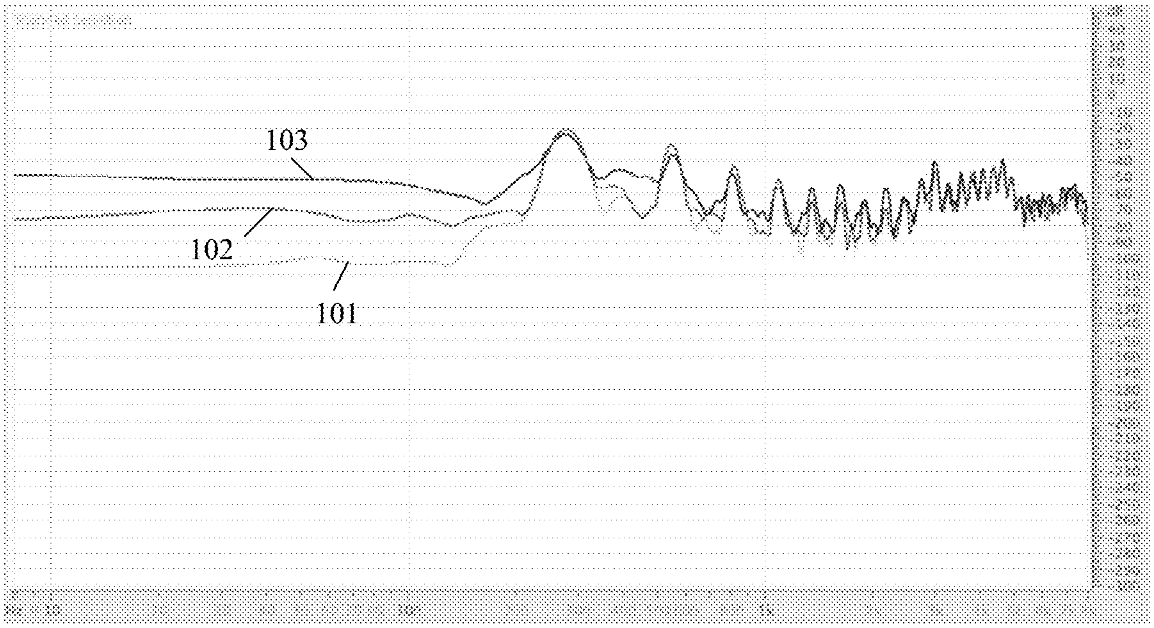
FIG. 1 is a schematic diagram of comparison between spectra at different bitrates according to some embodiments.

An audio signal is decomposed into a low-frequency subband signal and a high-frequency subband signal, and corresponding processing is separately performed on the low-frequency subband signal and the high-frequency subband signal, so that feature dimensionality of a high-frequency feature is lower than that of a low-frequency feature. In one aspect, the feature dimensionality of the low-frequency feature of the low-frequency subband signal that has greater impact on the audio signal is kept higher than that of the high-frequency feature of the high-frequency subband signal that has smaller impact on quality of audio encoding, so that a low-frequency component in an encoding result is retained to a maximum extent, and quality of an encoded audio signal is ensured. In another aspect, the feature dimensionality of the high-frequency feature of the-frequency subband signal becomes smaller. This actually reduces an amount of data in audio encoding, and improves audio encoding efficiency.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

In the following descriptions, the terms "first" and "second" are merely intended to distinguish between similar objects rather than describe a specific order of objects. It can be understood that the "first" and the "second" are interchangeable in order in proper circumstances, so that embodiments described herein can be implemented in an order other than the order illustrated or described herein.

Unless otherwise defined, meanings of all technical and scientific terms used herein are the same as those usually understood by a person skilled in the art to which the disclosure belongs. The terms used herein are merely intended to describe the objectives of various embodiments, but are not intended to be limiting.

Before embodiments are further described in detail, terms in various embodiments are described, and the following explanations are applicable to the terms in some embodiments.

(1) Neural network (NN): an algorithmic mathematical model that imitates behavioral characteristics of an animal neural network to perform distributed parallel information processing. Depending on system complexity, this type of network adjusts an interconnection relationship between a large number of internal nodes to process information.

(2) Deep learning (DL): a new research direction in the machine learning (ML) field. Deep learning is to learn inherent laws and representation levels of sample data. Information obtained during these learning processes is quite helpful in interpretations of data such as text, images, and sound. An ultimate goal is to enable a machine to have the same analytic learning ability as humans and be able to recognize data such as text, images, and sound.

(3) Quantization: a process of approximating continuous values (or a large number of discrete values) of a signal to a limited number of (or a few) discrete values. Quantization includes vector quantization (VQ) and scalar quantization.

The vector quantization is an effective lossy compression technology based on Shannon's rate distortion theory. A basic principle of the vector quantization is to use an index of a code word, in a code book, that best matches an input vector to replace the input vector for transmission and storage, and only a simple table lookup operation is required during decoding. For example, several pieces of scalar data constitute a vector space. The vector space is divided into several small regions. For a vector falling into a small region during quantization, a corresponding index is used to replace the input vector.

The scalar quantization is quantization on scalars, that is, one-dimensional vector quantization. A dynamic rang is divided into several intervals, and each interval has a representative value (namely, an index). When an input signal falls into an interval, the input signal is quantized into the representative value.

(4) Entropy encoding: a lossless encoding scheme in which no information is lost during encoding according to a principle of entropy, and also a key module in lossy encoding. Entropy encoding is performed at the end of an encoder. The entropy encoding includes Shannon encoding, Huffman encoding, exponential-Golomb (Exp-Golomb) encoding, and arithmetic encoding.

(5) Quadrature mirror filters (QMF): a filter pair including analysis-synthesis. A QMF analysis filter is used for subband signal decomposition to reduce signal bandwidth, so that each subband signal can be processed properly a respective channel. A QMF synthesis filter is used for synthesis of subband signals recovered from a decoder side, for example, reconstructing an original audio signal through zero-value interpolation, bandpass filtering, or the like.

A speech encoding technology is a technology of using a few network bandwidth resources to transmit speech information as much as possible. A compression ratio of a speech codec can reach more than 10 times. To be specific, after original 10-megabyte (MB) speech data is compressed by an encoder, only 1 MB of speech data needs to be transmitted. This greatly reduces bandwidth resources required for transmitting information. For example, for a wideband speech signal with a sampling rate of 16,000 hertz (Hz), if a sampling depth is 16 bits (precision for recording speech intensity during sampling), a bitrate (an amount of data transmitted per unit time) of an uncompressed version is 256 kilobits per second (kbps). If the speech encoding technology is used, even in the case of lossy encoding, quality of a reconstructed speech signal can be close to that of the uncompressed version within a bitrate range of 10-20 kbps, even without a difference in the sense of hearing. If a service with a higher sample rate is required, for example, 32000-Hz ultra-wideband speech, a bitrate range needs to reach at least 30 kbps.

In a communications system, to ensure proper communication, standard speech codec protocols are deployed in the industry, for example, standards from ITU-T, 3GPP, IETF, AVS, CCSA, and other standards organizations in and outside China, G.711, G.722, AMR series, EVS, OPUS, and other standards. FIG. 1 is a schematic diagram of comparison between spectra at different bitrates to illustrate a relationship between a compression bitrate and quality. A curve 101 is a spectral curve for original speech, namely, an uncompressed signal. A curve 102 is a spectral curve for an OPUS encoder at a bitrate of 20 kbps. A curve 103 is a spectral curve for OPUS encoding at a bitrate of 6 kbps. It can be learned from FIG. 1 that a compressed signal is closer to an original signal with an increase of an encoding bitrate.

A principle of speech encoding in the related art is generally as follows: During speech encoding, speech waveform samples can be directly encoded sample by sample. In some embodiments, related low-dimensionality features are extracted according to a vocalism principle of humans, an encoder encodes these features, and a decoder reconstructs a speech signal based on these parameters.

The foregoing encoding principles are derived from speech signal modeling, namely, a compression method based on signal processing. Compared with the compression method based on signal processing, to improve encoding efficiency while ensuring speech quality, some embodiments provide an audio processing method and apparatus, an electronic device, a non-transitory computer-readable storage medium, and a computer program product, to improve encoding efficiency. The following describes an electronic device provided in some embodiments. The electronic device provided in some embodiments may be implemented by a terminal device or a server or jointly implemented by a terminal device and a server. An example in which the electronic device is implemented by a terminal device is used for description.

Figure 2:
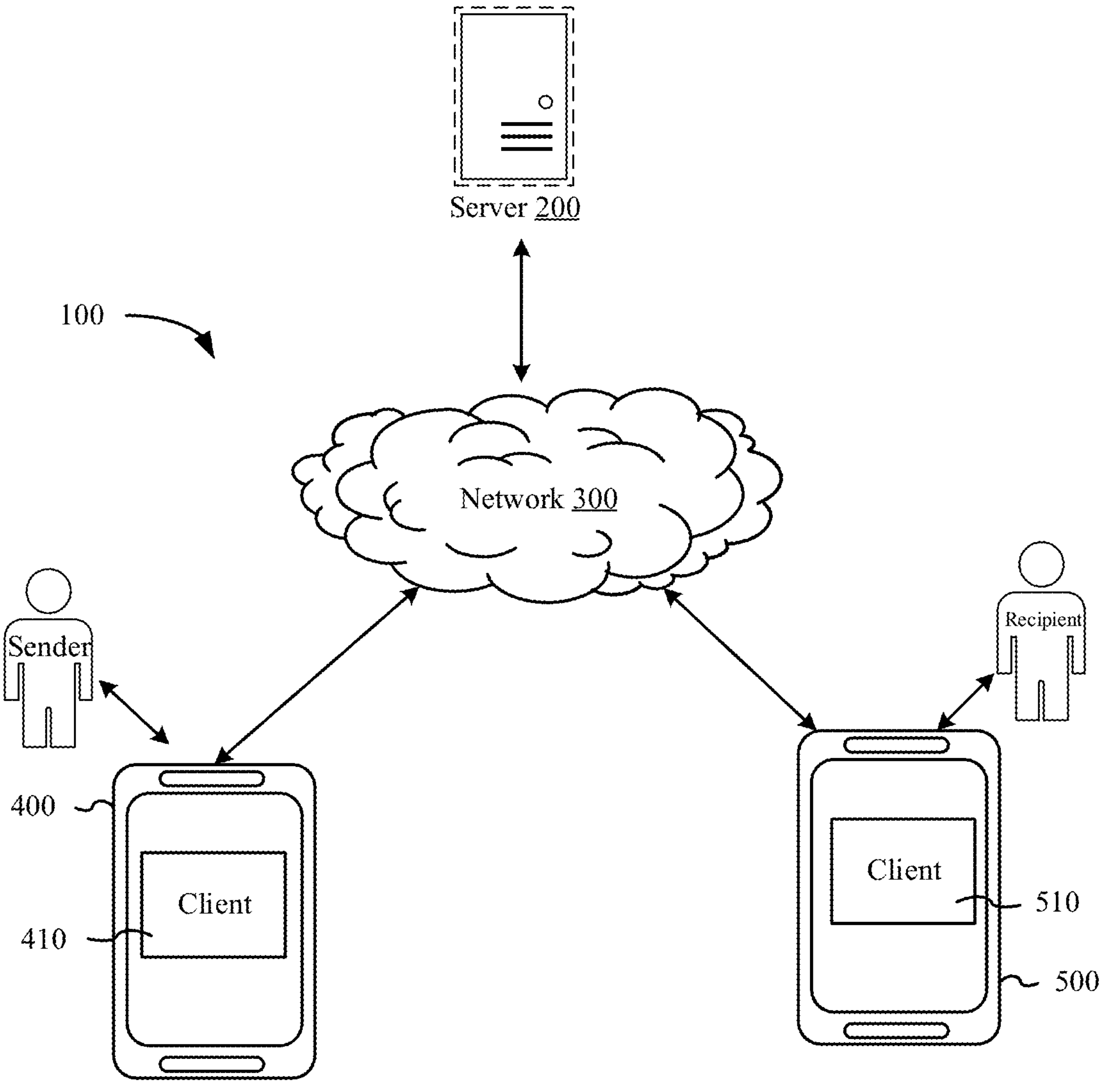
FIG. 2 is a schematic architectural diagram of an audio codec system according to some embodiments.

FIG. 2 is a schematic architectural diagram of an audio codec system 100 according to some embodiments. The audio codec system 100 includes: a server 200, a network 300, a terminal device 400 (namely, an encoder side), and a terminal device 500 (namely, a decoder side). The network 300 may be a local area network, a wide area network, or a combination thereof.

In some embodiments, a client 410 runs on the terminal device 400, and the client 410 may be various types of clients, for example, an instant messaging client, a web conferencing client, a livestreaming client, or a browser. In response to an audio capture instruction triggered by a sender (for example, an initiator of a network conference, an anchor, or an initiator of a voice call), the client 410 calls a microphone of the terminal device 400 to capture an audio signal, and encodes the captured audio signal to obtain a bitstream.

For example, the client 410 calls the audio processing method provided in some embodiments to encode the obtained audio signal, to be specific, perform the following operations: performing subband decomposition on the audio signal to obtain a low-frequency subband signal and a high-frequency subband signal of the audio signal; performing feature extraction on the low-frequency subband signal to obtain a low-frequency feature of the low-frequency subband signal; performing high-frequency analysis on the high-frequency subband signal to obtain a high-frequency feature of the high-frequency subband signal, feature dimensionality of the high-frequency feature being lower than that of the low-frequency feature; performing quantization encoding on the low-frequency feature to obtain a low-frequency bitstream of the audio signal; and performing quantization encoding on the high-frequency feature to obtain a high-frequency bitstream of the audio signal. The encoding sider (namely, the terminal device 400) performs differentiated signal processing on the low-frequency subband signal and the high-frequency subband signal, so that the feature dimensionality of the high-frequency feature is lower than that of the low-frequency feature, and quantization encoding is separately performed on the low-frequency feature and the high-frequency feature with reduced feature dimensionality. This improves audio encoding efficiency while ensuring audio quality.

The client 410 may transmit the bitstreams (namely, the low-frequency bitstream and the high-frequency bitstream) to the server 200 through the network 300, so that the server 200 transmits the bitstreams to the terminal device 500 associated with a recipient (for example, a participant of the network conference, an audience, or a recipient of the voice call).

In some embodiments, after receiving the bitstreams transmitted by the server 200, a client 510 (for example, an instant messaging client, a web conferencing client, a livestreaming client, or a browser) may decode the bitstreams to obtain the audio signal, to implement audio communication.

For example, the client 510 calls the audio processing method provided in some embodiments to decode the received bitstreams, to be specific, perform the following operations: performing quantization decoding on the low-frequency bitstream to obtain a low-frequency feature corresponding to the low-frequency bitstream; performing quantization decoding on the high-frequency bitstream to obtain a high-frequency feature corresponding to the high-frequency bitstream; performing feature reconstruction on the low-frequency feature to obtain a low-frequency subband signal corresponding to the low-frequency feature; performing high-frequency reconstruction on the high-frequency feature to obtain a high-frequency subband signal corresponding to the high-frequency feature; and performing subband synthesis on the low-frequency subband signal and the high-frequency subband signal to obtain a decoded audio signal.

Some embodiments may be implemented by using a cloud technology. The cloud technology is a hosting technology that integrates a series of resources such as hardware, software, and network resources in a wide area network or a local area network implement data computing, storage, processing, and sharing.

The cloud technology is a general term for a network technology, an information technology, an integration technology, a management platform technology, an application technology, and the like that are based on application of a cloud computing business model, and may constitute a resource pool for use on demand and therefore is flexible and convenient. A cloud computing technology is to become an important support. A function of service interaction between servers 200 may be implemented by using a cloud technology.

For example, the server 200 shown in FIG. 2 may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform. The terminal device 400 and the terminal device 500 shown in FIG. 2 each may be a smartphone, a tablet computer, a notebook computer, a desktop computer, a smart speaker, a smartwatch, a vehicle-mounted terminal, or the like, but is not limited thereto. The terminal device (for example, the terminal device 400 and the terminal device 500) and the server 200 may be directly or indirectly connected in a wired or wireless communication mode. This is not limited herein.

In some embodiments, the terminal device or the server 200 may implement the audio processing method by running a computer program. For example, the computer program may be a native program or software module in an operating system. The computer program may be a native application (APP), to be specific, a program that needs to be installed in an operating system to run, for example, a livestreaming APP, a web conferencing APP, or an instant messaging APP; or may be a mini program, to be specific, a program that only needs to be downloaded to a browser environment to run. To sum up, the computer program may be an application, a module, or a plug-in in any form.

In some embodiments, a plurality of servers may constitute a blockchain network, and the server 200 is a node in the blockchain network. There may be an information connection between nodes in the blockchain network, and information may be transmitted between nodes through the information connection. Data (for example, logic and bitstreams of audio processing) related to the audio processing method provided in some embodiments may be stored in the blockchain network. An operation performed by any server on the data needs to be confirmed by other servers through a consensus algorithm, to avoid unauthorized data tampering and avoid unnecessary data leakage.

Figure 3A:
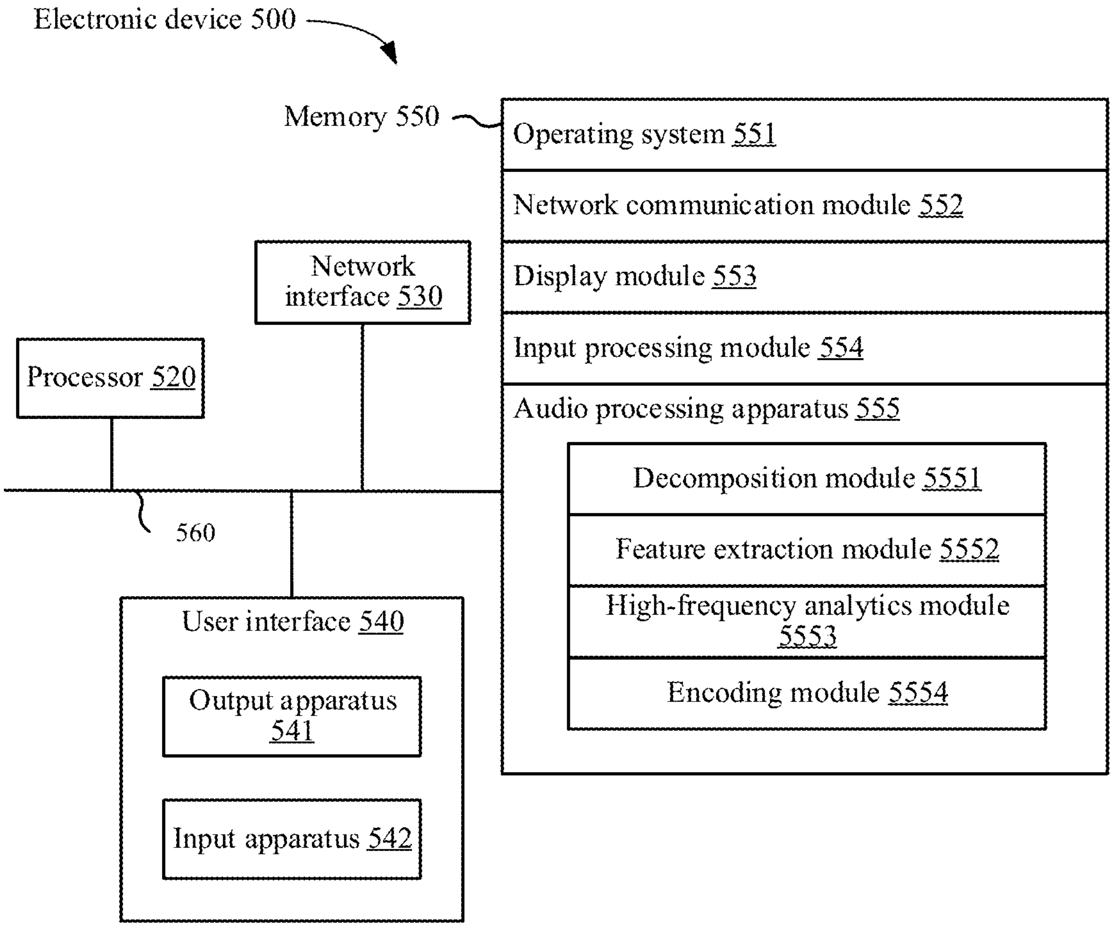
FIG. 3A is a schematic structural diagram of an electronic device according to some embodiments.
Figure 3B:
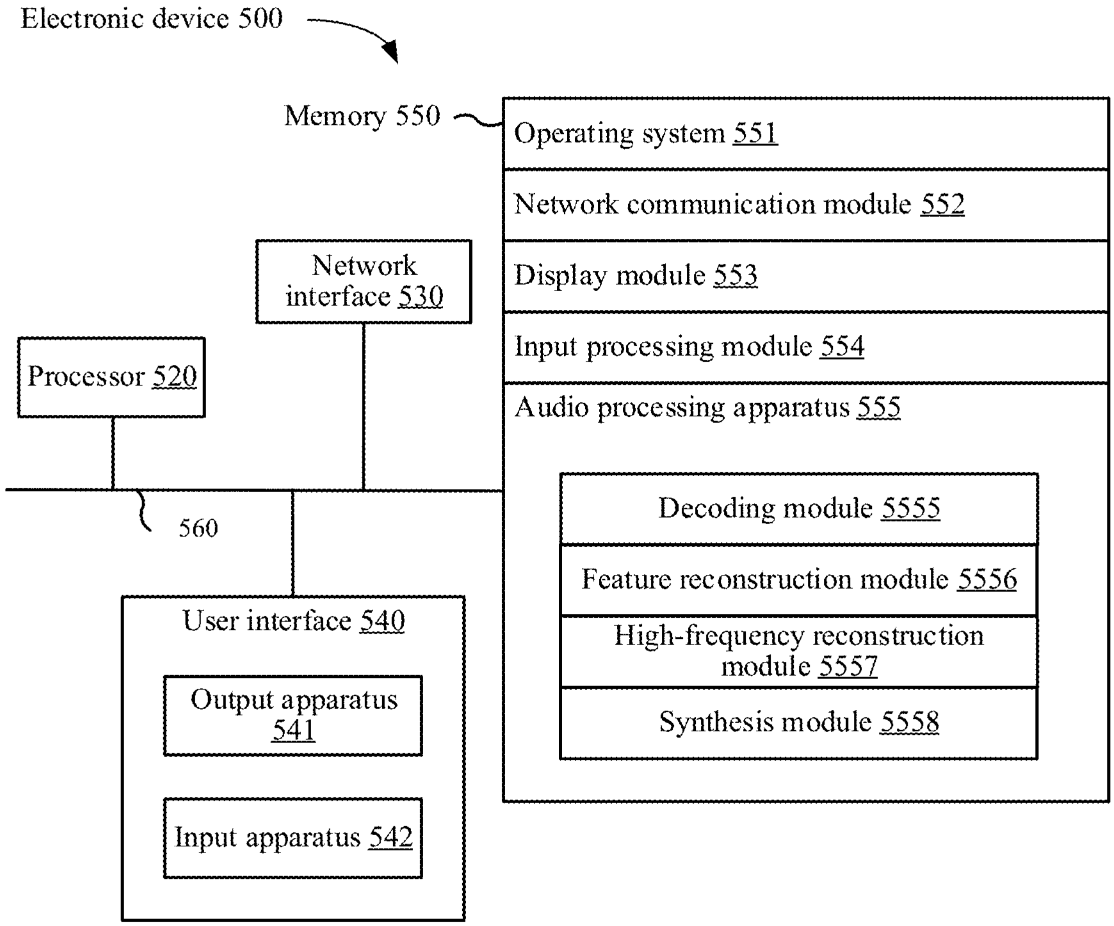
FIG. 3B is a schematic structural diagram of an electronic device according to some embodiments.

FIG. 3A and FIG. 3B are schematic structural diagrams of an electronic device 500 according to some embodiments. An example in which the electronic device 500 is a terminal device is used for description. The electronic device 500 shown in FIG. 3A and FIG. 3B includes at least one processor 520, a memory 550, at least one network interface 530, and a user interface 540. The components in the electronic device 500 are coupled together through a bus system 560. It may be understood that, the bus system 560 is configured to implement connection and communication between the components. In addition to a data bus, the bus system 560 further includes a power bus, a control bus, and a state signal bus. However, for ease of clear description, all types of buses in FIG. 3A and FIG. 3B are marked as the bus system 560.

The processor 520 may be an integrated circuit chip with a signal processing capability, for example, a general-purpose processor, a digital signal processor (DSP), another programmable logic device, a discrete gate or transistor logic device, or a discrete hardware component. The general-purpose processor may be a microprocessor, any conventional processor, or the like.

The user interface 540 includes one or more output apparatuses 541 capable of displaying media content, including one or more speakers and/or one or more visual display screens. The user interface 540 further includes one or more input apparatuses 542, including user interface components for facilitating user input, for example, a keyboard, a mouse, a microphone, a touch display screen, a camera, or another input button or control.

The memory 550 may be a removable memory, a non-removable memory, or a combination thereof. Exemplary hardware devices include a solid-state memory, a hard disk drive, an optical disc drive, and the like. In some embodiments, the memory 550 includes one or more storage devices physically located away from the processor 520.

The memory 550 includes a volatile memory or a non-volatile memory, or may include both a volatile memory and a non-volatile memory. The non-volatile memory may be a read-only memory (ROM). The volatile memory may be a random access memory (RAM). The memory 550 described in this embodiment is intended to include any suitable type of memory.

In some embodiments, the memory 550 is capable of storing data to support various operations. Examples of the data include a program, a module, and a data structure or a subset or superset thereof. Examples are described below:

- an operating system 551, including system programs for processing various basic system services and performing hardware-related tasks, for example, a framework layer, a core library layer, and a driver layer for implementing various basic services and processing hardware-based tasks;
- a network communication module 552, configured to reach another computing device through one or more (wired or wireless) network interfaces 530, exemplary network interfaces 530 including Bluetooth, wireless fidelity (Wi-Fi), universal serial bus (USB), and the like;
- a display module 553, configured to display information by using one or more output apparatuses 541 (for example, a display screen or a speaker) associated with the user interface 540 (for example, a user interface for operating a peripheral device and displaying content and information); and
- an input processing module 554, configured to detect one or more user inputs or interactions from one or more input apparatuses 542 and translate the detected inputs or interactions.

In some embodiments, an audio processing apparatus may be implemented by using software. FIG. 3A and FIG. 3B show an audio processing apparatus 555 stored in the memory 550. The audio processing apparatus 555 may be software in the form of a program or a plug-in, and includes the following software modules: a decomposition module 5551, a feature extraction module 5552, a high-frequency analysis module 5553, and an encoding module 5554; or a decoding module 5555, a feature reconstruction module 5556, a high-frequency reconstruction module 5557, and a synthesis module 5558. The decomposition module 5551, the feature extraction module 5552, the high-frequency analysis module 5553, and the encoding module 5554 are configured to implement an audio encoding function.

FIG. 3B shows an audio processing apparatus 555 stored in the memory 550. The apparatus may include the decoding module 5555, the feature reconstruction module 5556, the high-frequency reconstruction module 5557, and the synthesis module 5558 for implementing an audio decoding function. These modules are logical modules, and therefore may be flexibly combined or further split based on an implemented function.

Figure 4:
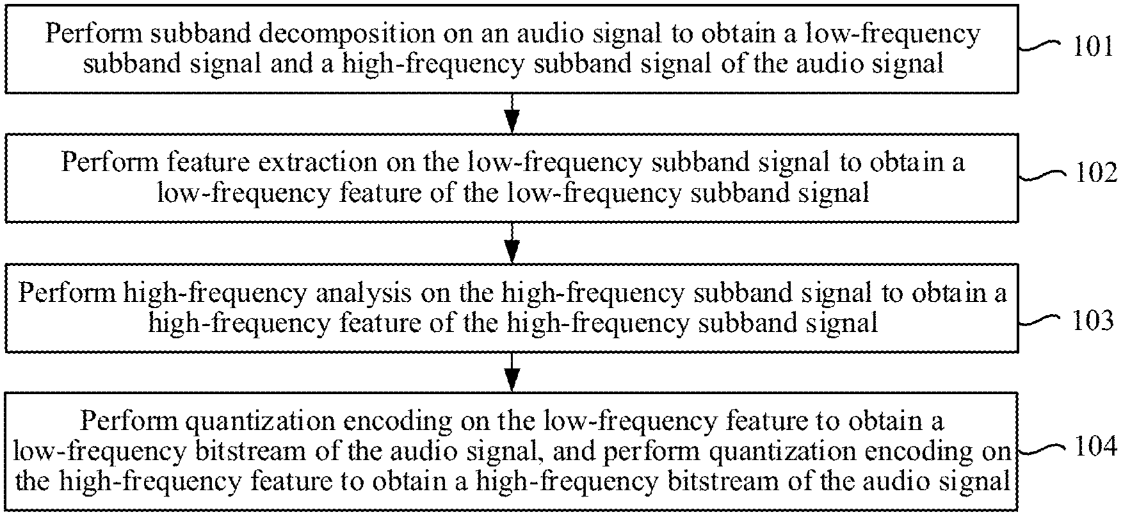
FIG. 4 is a schematic flowchart of an audio processing method according to some embodiments.

As described above, the audio processing method provided in some embodiments may be implemented by various types of electronic devices. FIG. 4 is a schematic flowchart of an audio processing method according to some embodiments. An audio encoding function is implemented through audio processing. Descriptions are provided below with reference to operations shown in FIG. 4.

In operation 101, subband decomposition is performed on an audio signal to obtain a low-frequency subband signal and a high-frequency subband signal of the audio signal.

In an example of obtaining the audio signal, an encoder side responds to an audio capture instruction triggered by a sender (for example, an initiator of a network conference, an anchor, or an initiator of a voice call), and calls a microphone of a terminal device on the encoder side to capture an audio signal to obtain the audio signal (also referred to as an input signal).

After the audio signal is obtained, the audio signal is decomposed into the low-frequency subband signal $x_{LB}(n)$ and the high-frequency subband signal $x_{HB}(n)$ through a QMF analysis filter. Because the low-frequency subband signal has greater impact on audio encoding than the high-frequency subband signal does, differentiated signal processing can be subsequently performed on the low-frequency subband signal and the high-frequency subband signal.

In some embodiments, the performing subband decomposition the audio signal to obtain the low-frequency subband signal and the high-frequency subband signal of the audio signal may be implemented in the following manner: sampling the audio signal to obtain a sampled signal, the sampled signal including a plurality of sample points obtained through sampling; performing low-pass filtering on the sampled signal to obtain a low-pass filtered signal; downsampling the low-pass filtered signal to obtain the low-frequency subband signal of the audio signal; performing high-pass filtering on the sampled signal to obtain a high-pass filtered signal; and downsampling the high-pass filtered signal to obtain the high-frequency subband signal of the audio signal.

The audio signal is a continuous analog signal, the sampled signal is a discrete digital signal, and the sample point is a sampled value obtained from the audio signal through sampling.

In some embodiments, an input signal with a sampling rate Fs of 32,000 Hz is used as an example. The input signal is sampled to obtain a sampled signal x(n) including 640 sample points. An analysis filter (two channels) of QMF filters is called to perform low-pass filtering on the sampled signal to obtain a low-pass filtered signal, perform high-pass filtering on the sampled signal to obtain a high-pass filtered signal, downsample the low-pass filtered signal to obtain a low-frequency subband signal $x_{LB}(n)$ of the audio signal, and downsample the high-pass filtered signal to obtain a high-frequency subband signal $x_{HB}(n)$ of the audio signal. Effective bandwidth for the low-frequency subband signal $x_{LB}(n)$ and the high-frequency subband signal $x_{HB}(n)$ is 0-8 kHz and 8-16 kHz respectively. The low-frequency subband signal $x_{LB}(n)$ and the high-frequency subband signal $x_{HB}(n)$ each have 320 sample points.

The QMF filters are a filter pair that includes analysis and synthesis. For the QMF analysis filter, an input signal with a sampling rate of Fs may be decomposed into two signals with a sampling rate of Fs/2, which represent a QMF low-pass signal and a QMF high-pass signal respectively. A reconstructed signal, with a sampling rate of Fs, that corresponds to the input signal may be restored through synthesis performed by a QMF synthesis filter on a low-pass signal and a high-pass signal that are restored on a decoder side.

In operation 102, feature extraction is performed on the low-frequency subband signal to obtain a low-frequency feature of the low-frequency subband signal.

In some embodiments, for example, because the low-frequency subband signal has greater impact on audio encoding than the high-frequency subband signal does, feature extraction may be performed on the low-frequency subband signal through a neural network model to obtain the low-frequency feature of the low-frequency subband signal, to minimize feature dimensionality of the low-frequency feature while ensuring integrity of the low-frequency feature. A structure of a neural network model is not limited herein. Dimensionality of the low-frequency feature of the low-frequency subband signal is lower than that of the low-frequency subband signal.

In some embodiments, the performing feature extraction on the low-frequency subband signal to obtain the low-frequency feature of the low-frequency subband signal includes: performing convolution on the low-frequency subband signal to obtain convolution feature of the low-frequency subband signal; performing pooling on the convolution feature to obtain a pooling feature of the low-frequency subband signal; downsampling the pooling feature to obtain a downsampling feature of the low-frequency subband signal; and performing convolution on the downsampling feature to obtain the low-frequency feature of the low-frequency subband signal.

Figure 11:
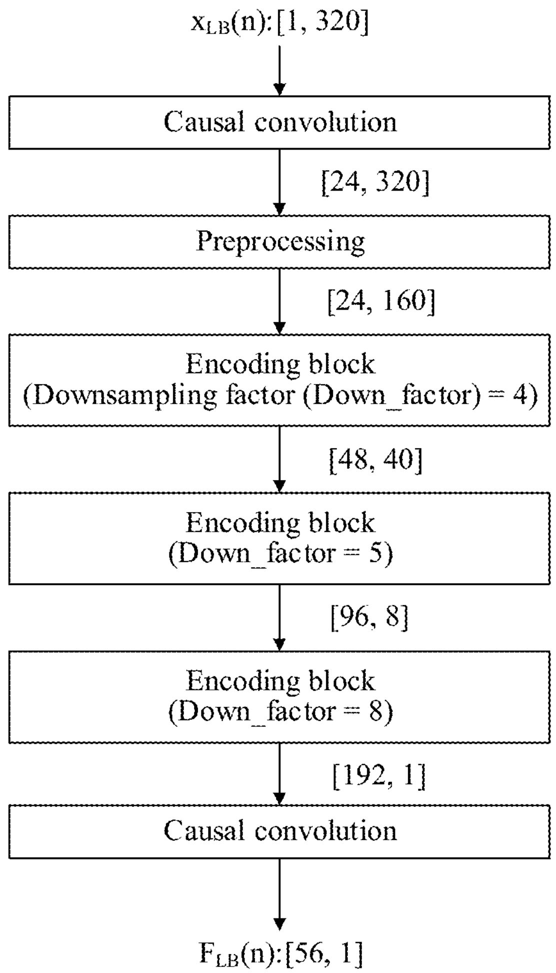
FIG. 11 is a schematic diagram of a first neural network according to some embodiments.

As shown in FIG. 11, a neural network model is called based on the low-frequency subband signal $x_{LB}(n)$ to generate a feature vector $F_{LB}(n)$ with lower dimensionality, namely, the low-frequency feature. First, convolution is performed on the input low-frequency subband signal $x_{LB}(n)$ through causal convolution to obtain a 24×320 convolution feature. Then pooling (namely, preprocessing) with a factor of 2 is performed on the 24×320 convolution feature to obtain a 24×160 pooling feature. Then the 24×160 pooling feature is downsampled to obtain a 192×1 downsampling feature. Finally, convolution is performed on the 192×1 downsampling feature through causal convolution again to obtain a 56-dimensional feature vector $F_{LB}(n)$.

In some embodiments, the downsampling is implemented through a plurality of concatenated encoding layers; and the downsampling the pooling feature to obtain a downsampling feature of the low-frequency subband signal may be implemented in the following manner: downsampling the pooling feature through the first encoding layer of the plurality of concatenated encoding layers; outputting a downsampling result of the first encoding layer to a subsequent concatenated encoding layer, and continuing to perform downsampling and output a downsampling result through the subsequent concatenated encoding layer, until the last encoding layer performs output; and using a downsampling result outputted by the last encoding layer as the downsampling feature of the low-frequency subband signal.

As shown in FIG. 11, the pooling feature is downsampled through three concatenated encoding blocks (namely, encoding layers) with different downsampling factors (Down_factor). In some embodiments, the 24×160 pooling feature is first downsampled through an encoding block with a Down_factor of 4 to obtain a 48×40 downsampling result. Then the 48×40 downsampling result is downsampled through an encoding block with a Down_factor of 5 to obtain a 96×8 downsampling result. Finally, the 96×8 downsampling result is downsampled through an encoding block with a Down_factor of 8 to obtain the 192×1 downsampling feature. The encoding block with a Down_factor of 4 is used as an example. One or more dilated convolutions may be first performed, and pooling is performed based on the Down_factor to implement a function of downsampling.

After processing is performed through an encoding layer, an understanding of the downsampling feature is further deepened. When learning is performed through a plurality of encoding layers, the downsampling feature of the low-frequency subband signals can be accurately learned step by step. The downsampling feature of the low-frequency subband signal with progressive precision can be obtained through concatenated encoding layers.

In operation 103, high-frequency analysis is performed on the high-frequency subband signal to obtain a high-frequency feature of the high-frequency subband signal.

Feature dimensionality of the high-frequency feature is lower than that of the low-frequency feature. Because the low-frequency subband signal has greater impact on audio encoding than the high-frequency subband signal does, differentiated signal processing is performed on the low-frequency subband signal and the high-frequency subband signal, so that the feature dimensionality of the high-frequency feature is lower than that of the low-frequency feature. Dimensionality of the high-frequency feature of the high-frequency subband signal is lower than that of the high-frequency subband signal. The high-frequency analysis is used to reduce dimensionality of the high-frequency subband signal to implement a function of data compression.

In some embodiments, the performing high-frequency analysis on the high-frequency subband signal to obtain the high-frequency feature of the high-frequency subband signal may be implemented in the following manner: A first neural network model is called to perform feature extraction on the high-frequency subband signal to obtain the high-frequency feature of the high-frequency subband signal.

Figure 12:
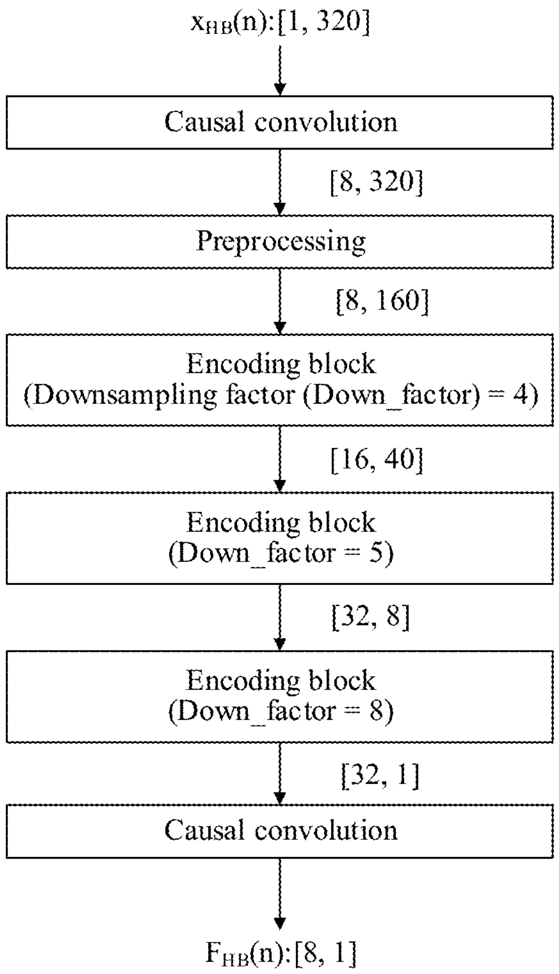
FIG. 12 is a schematic diagram of a neural network structure for a high-frequency subband signal according to some embodiments.

For example, the first neural network model (as shown in FIG. 12) similar to the neural network model for the low-frequency subband signal may be called for the high-frequency subband signal, and convolution is performed on the high-frequency subband signal through the first neural network model to obtain a convolution feature of the high-frequency subband signal. Pooling is performed on the convolution feature to obtain a pooling feature of high-frequency subband signal. The pooling feature is downsampled to obtain a downsampling feature of the high-frequency subband signal. Convolution is performed on the downsampling feature to obtain the high-frequency feature of the high-frequency subband signal.

Compared with the low-frequency subband signal, the high-frequency subband signal are less important to quality. Therefore, a structure of the first neural network model for the high-frequency subband signal (FIG. 12) may be less complex than that shown in FIG. 11. For example, compared to the model structure shown in FIG. 11, the model structure shown in FIG. 12 may include fewer channels to save computing resources.

In some embodiments, the performing high-frequency analysis on the high-frequency subband signal to obtain the high-frequency feature of the high-frequency subband signal may be implemented in the following manner: performing bandwidth extension on the high-frequency subband signal to obtain the high-frequency feature of the high-frequency subband signal.

For example, compared with the low-frequency subband signal, the high-frequency subband signal are less important to quality. Therefore, a wideband speech signal may be restored from a narrowband speech signal with a limited frequency band through bandwidth extension, to quickly compress the high-frequency subband signal and extract the high-frequency feature of the high-frequency subband signal.

In some embodiments, the performing bandwidth extension on the high-frequency subband signal to obtain the high-frequency feature of the high-frequency subband signal may be implemented in the following manner: performing frequency domain transform based on a plurality of sample points included in the high-frequency subband signal to obtain transform coefficients respectively corresponding to the plurality of sample points; dividing the transform coefficients respectively corresponding to the plurality of sample points into a plurality of subbands; calculating a mean based on a transform coefficient included in each subband to obtain average energy corresponding to each subband, and using the average energy as a subband spectral envelope corresponding to each subband; and determining subband spectral envelopes respectively corresponding to the plurality of subbands as the high-frequency feature of the high-frequency subband signal.

For example, a frequency domain transform method in some embodiments may include modified discrete cosine transform (MDCT), discrete cosine transform (DCT), and fast Fourier transform (FFT). A frequency domain transform manner is not limited herein. A type of the mean calculated in some embodiments include an arithmetic mean and a geometric mean. A manner of mean processing is not limited herein.

In some embodiments, the performing frequency domain transform based on a plurality of sample points included in the high-frequency subband signal to obtain transform coefficients respectively corresponding to the plurality of sample points includes: obtaining a reference high-frequency subband signal of a reference audio signal, the reference audio signal being an audio signal adjacent to the audio signal; and performing, based on a plurality of sample points included in the reference high-frequency subband signal and the plurality of sample points included in the high-frequency subband signal, discrete cosine transform on the plurality of sample points included in the high-frequency subband signal to obtain the transform coefficients respectively corresponding to the plurality of sample points included in the high-frequency subband signal.

In some embodiments, a process of calculating the mean based on the transform coefficients included in each subband is as follows: A sum of squares of transform coefficients corresponding to sample points included in each subband is determined; and a ratio of the sum of squares to a quantity of sample points included in the subband is determined as the average energy corresponding to each subband.

In an example, the modified discrete cosine transform (MDCT) is called for the high-frequency subband signal $x_{HB}(n)$ including 320 points to generate MDCT coefficients for the 320 points (namely, the transform coefficients respectively corresponding to the plurality of sample points included in the high-frequency subband signal). Specifically, in the case of 50% overlapping, an $(n+1)^{th}$ frame of high-frequency data (namely, the reference audio signal) and an $n^{th}$ frame of high-frequency data (namely, the audio signal) may be combined (spliced), and MDCT is performed for 640 points to obtain the MDCT coefficients for the 320 points.

The MDCT coefficients for the 320 points are divided into N subbands (that is, the transform coefficients respectively corresponding to the plurality of sample points are divided into a plurality of subbands). The subband herein combines a plurality of adjacent MDCT coefficients into a group, and the MDCT coefficients for the 320 points may be divided into eight subbands. For example, the 320 points may be evenly allocated, in other words, each subband includes a same quantity of points. In some embodiments, the 320 points may be divided unevenly. For example, a lower-frequency subband includes fewer MDCT coefficients (with a higher frequency resolution), and a higher-frequency subband includes more MDCT coefficients (with a lower frequency resolution).

According to the Nyquist sampling theorem (to restore an original signal from a sampled signal without distortion, a sampling frequency needs to be greater than 2 times the highest frequency of the original signal, and when a sampling frequency is less than 2 times the highest frequency of a spectrum, spectra of signals overlap, or when a sampling frequency is greater than 2 times the highest frequency of the spectrum, spectra of signals do not overlap), the MDCT coefficients for the 320 points represent a spectrum of 8-16 kHz. However, UWB speech communication does not necessarily require a spectrum of 16 kHz. For example, if a spectrum is set to 14 kHz, only MDCT coefficients for the first 240 points need to be considered, and correspondingly, a quantity of subbands may be controlled to be 6.

For each subband, average energy of all MDCT coefficients in the current subband is calculated (that is, mean processing is performed on transform coefficients included in each subband) as a subband spectral envelope (the spectral envelope is a smooth curve passing through principal peak points of a spectrum). For example, the MDCT coefficients included in the current subband are x(n), where n=1, 2, . . . , 40. In this case, average energy is calculated by using a geometric mean: $Y=((x(1)^2+x(2)^2+ \dots +x(40)^2)/40)$. In a case that the MDCT coefficients for the 320 points are divided into eight subbands, eight subband spectral envelopes may be obtained. The eight subband spectral envelopes are a generated feature vector $F_{HB}(n)$, namely, the high-frequency feature, of the high-frequency subband signal.

In step 104, quantization encoding is performed on the low-frequency feature to obtain a low-frequency bitstream of the audio signal, and quantization encoding is performed on the high-frequency feature to obtain a high-frequency bitstream of the audio signal.

In some embodiments, the low-frequency feature is quantized to obtain an index value of the low-frequency feature; entropy encoding is performed on the index value of the low-frequency feature to obtain the low-frequency bitstream of the audio signal; the high-frequency feature is quantized into an index value of the high-frequency feature; and entropy encoding is performed on the index value of the high-frequency feature to obtain the high-frequency bitstream of the audio signal.

For example, scalar quantization (each component is quantized separately) and entropy encoding may be performed on the feature vector $F_{LB}(n)$ of the low-frequency subband signal and the feature vector $F_{HB}(n)$ of the high-frequency subband signal. In addition, a combination of the vector quantization (a plurality of adjacent components are combined into a vector for joint quantization) and entropy encoding technologies is not limited herein. An encoded high-frequency bitstream and an encoded low-frequency bitstream are transmitted to the decoder side, and the decoder side decodes the high-frequency bitstream and the low-frequency bitstream.

Differentiated signal processing is performed on the low-frequency subband signal and the high-frequency subband signal. In one aspect, the feature dimensionality of the low-frequency feature with greater impact on the audio signal is kept to be higher than that of the high-frequency feature, to ensure quality of an encoded audio signal. In another aspect, the feature dimensionality of the high-frequency feature with smaller impact on quality of the audio signal is reduced. This reduces an amount of data for quantization encoding and improves encoding efficiency.

Figure 5:
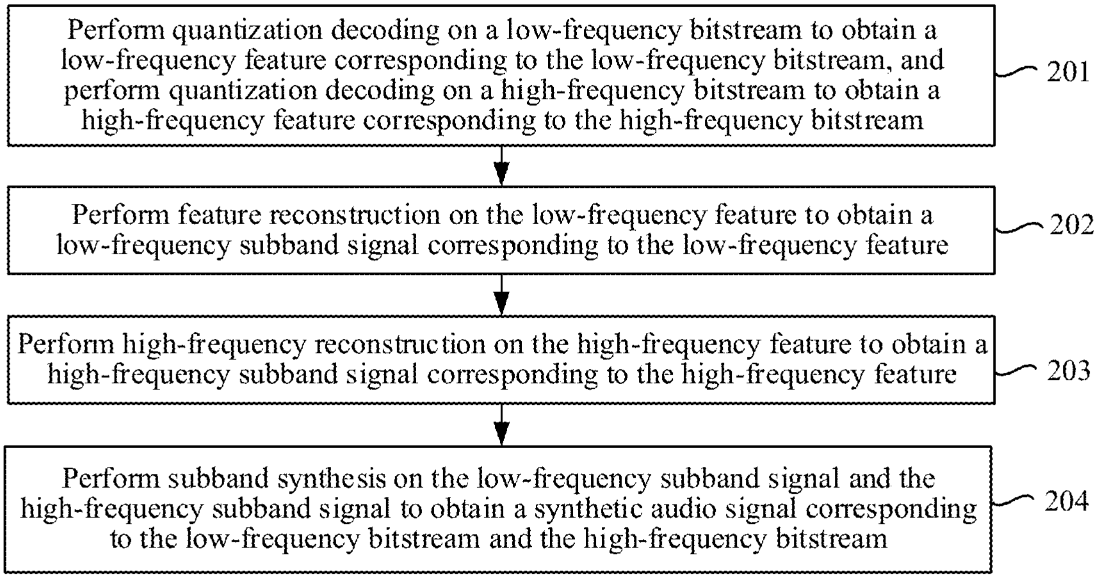
FIG. 5 is a schematic flowchart of an audio processing method according to some embodiments.

As described above, the audio processing method provided in some embodiments may be implemented by various types of electronic devices. FIG. 5 is a schematic flowchart of an audio processing method according to some embodiments. An audio decoding function is implemented through audio processing. Descriptions are provided below with reference to operations shown in FIG. 5.

In operation 201, quantization decoding is performed on a low-frequency bitstream to obtain a low-frequency feature corresponding to the low-frequency bitstream, and quantization decoding is performed on a high-frequency bitstream to obtain a high-frequency feature corresponding to the high-frequency bitstream.

The low-frequency bitstream and the high-frequency bitstream are obtained by encoding subband signals that are obtained through subband decomposition on an audio signal, and feature dimensionality of the high-frequency feature is lower than that of the low-frequency feature.

For example, after the high-frequency bitstream and the low-frequency bitstream are obtained through encoding by using the audio processing method shown in FIG. 4, the encoded high-frequency bitstream and low-frequency bitstream are transmitted to a decoder side. After receiving the high-frequency bitstream and the low-frequency bitstream, the decoder side performs quantization decoding on the low-frequency bitstream to obtain the low-frequency feature corresponding to the low-frequency bitstream, and performs quantization decoding on the high-frequency bitstream to obtain the high-frequency feature corresponding to the high-frequency bitstream.

The quantization decoding is an inverse process of quantization encoding. In a case that a bitstream is received, entropy decoding is first performed. Through lockup of a quantization table (to be specific, inverse quantization is performed, where the quantization table is a mapping table generated through quantization during encoding), an estimated value $F'_{LB}(n)$ of a low-frequency feature vector, namely, the low-frequency feature corresponding to the low-frequency bitstream, is obtained; and an estimated value $F'_{HB}(n)$ of a high-frequency feature vector, namely, the high-frequency feature corresponding to the high-frequency bitstream, is obtained. A process of decoding the received bitstream by the decoder side is an inverse process of an encoding process on an encoder side. Therefore, a value generated during decoding is an estimated value relative to a value obtained during encoding. For example, the high-frequency feature generated during decoding is an estimated value relative to a high-frequency feature obtained during encoding.

For example, the performing quantization decoding on the low-frequency bitstream to obtain the low-frequency feature corresponding to the low-frequency bitstream includes: performing entropy decoding on the low-frequency bitstream to obtain an index value corresponding to the low-frequency bitstream; and performing inverse quantization on the index value corresponding to the low-frequency bitstream to obtain the low-frequency feature corresponding to the low-frequency bitstream; and the performing quantization decoding on the high-frequency bitstream to obtain the high-frequency feature corresponding to the high-frequency bitstream may be implemented in the following manner: performing entropy decoding on the high-frequency bitstream to obtain an index value corresponding to the high-frequency bitstream; and performing inverse quantization on the index value corresponding to the high-frequency bitstream to obtain the high-frequency feature corresponding to the high-frequency bitstream.

In operation 202, feature reconstruction is performed on the low-frequency feature to obtain a low-frequency subband signal corresponding to the low-frequency feature.

For example, feature reconstruction is an inverse process of feature extraction, and feature reconstruction is performed on the low-frequency feature to obtain the low-frequency subband signal (an estimated value) corresponding to the low-frequency feature.

In some embodiments, the performing feature reconstruction on the low-frequency feature to obtain the low-frequency subband signal corresponding to the low-frequency feature may be implemented in the following manner: performing convolution on the low-frequency feature to obtain a convolution feature of the low-frequency feature; upsampling the convolution feature to obtain an upsampling feature of the low-frequency feature; performing pooling on the upsampling feature to obtain a pooling feature of the low-frequency feature; and performing convolution on the pooling feature to obtain a low-frequency subband signal corresponding to the low-frequency feature.

Figure 13:
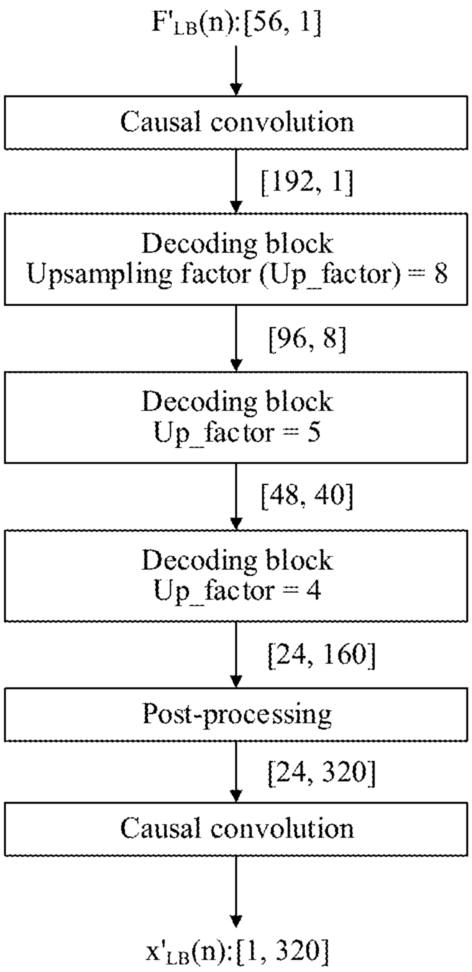
FIG. 13 is a schematic diagram of a second neural network according to some embodiments.

As shown in FIG. 13, based on the low-frequency feature vector $F'_{LB}(n)$, a neural network model shown in FIG. 13 is called to generate the low-frequency subband signal $x'_{LB}(n)$. The neural network model shown in FIG. 13 is similar to that shown in FIG. 11. For example, structures of causal convolution and post-processing are similar to that of preprocessing. A structure of a decoding block is symmetric with that of an encoding block on the encoder side. This is specifically manifested in the following aspects: For the encoding block on the encoder side, dilated convolution is first perform, and then pooling and downsampling are performed. For the decoding block on the decoder side, pooling is first performed, and then upsampling and dilated convolution are performed.

First, convolution is performed on the input low-frequency feature vector $F'_{LB}(n)$ through causal convolution to obtain a 192×1 convolution feature. Then the 192×1 convolution feature is upsampled to obtain a 24×160 upsampling feature. Then pooling (namely, post-processing) is performed on the 24×160 upsampling feature to obtain a 24×320 pooling feature. Finally, convolution is performed on the pooling feature through causal convolution again to obtain a 320-dimensional low-frequency subband signal $x'_{LB}(n)$.

In some embodiments, the upsampling is implemented through a plurality of concatenated decoding layers; and the upsampling the convolution feature to obtain the upsampling feature of the low-frequency feature may be implemented in the following manner: upsampling the convolution feature through the first decoding layer of the plurality of concatenated decoding layers; outputting an upsampling result of the first decoding layer to a subsequent concatenated decoding layer, and continuing to perform upsampling and output an upsampling result through the subsequent concatenated decoding layer, until the last decoding layer performs output; and using an upsampling result outputted by the last decoding layer as the upsampling feature of the low-frequency feature.

As shown in FIG. 13, the convolution feature is upsampled through three concatenated encoding blocks (namely, decoding layers) with different upsampling factors (Up_factor). To be specific, the 192×1 convolution feature is first upsampled through a decoding block with an Up_factor of 8 to obtain a 96×8 upsampling result. Then the 96×8 upsampling result is upsampled through a decoding block with an Up_factor of 5 to obtain a 48×40 upsampling result. Finally, the 48×40 upsampling result is upsampled through a decoding block with an Up_factor of 4 to obtain the 24×160 upsampling feature. The decoding block with an Up_factor of 4 is used as an example. Pooling may be first performed based on the Up_factor. Then one or more dilated convolutions are performed, to implement a function of upsampling.

After processing is performed through a decoding layer, an understanding of the upsampling feature is further deepened. When learning is performed through a plurality of decoding layers, the upsampling feature of the low-frequency feature can be accurately learned step by step. The upsampling feature of the low-frequency feature with progressive precision can be obtained through concatenated decoding layers.

In Step 203, high-frequency reconstruction is performed on the high-frequency feature to obtain a high-frequency subband signal corresponding to the high-frequency feature.

For example, the high-frequency reconstruction is an inverse process of high-frequency analysis, and dimensionality of the high-frequency feature is increased through high-frequency reconstruction, to implement a function of data decompression.

In some embodiments, the performing high-frequency reconstruction on the high-frequency feature to obtain the high-frequency subband signal corresponding to the high-frequency feature may be implemented in the following manner: calling a second neural network model to perform feature reconstruction on the high-frequency feature through the second neural network model to obtain the high-frequency subband signal corresponding to the high-frequency feature.

For example, in a case that the encoder side performs feature extraction on the high-frequency subband signal to obtain the high-frequency feature, the decoder side performs feature reconstruction on the high-frequency feature to obtain the high-frequency subband signal corresponding to the high-frequency feature.

In some embodiments, the performing high-frequency reconstruction on the high-frequency feature to obtain the high-frequency subband signal corresponding to the high-frequency feature may be implemented in the following manner: performing inverse processing of bandwidth extension on the high-frequency feature to obtain the high-frequency subband signal corresponding to the high-frequency feature.

For example, in a case that the encoder side performs bandwidth extension on the high-frequency subband signal to obtain the high-frequency feature, the decoder side performs inverse processing of bandwidth extension on the high-frequency feature to obtain the high-frequency subband signal corresponding to the high-frequency feature.

In some embodiments, the performing inverse processing of bandwidth extension on the high-frequency feature to obtain the high-frequency subband signal corresponding to the high-frequency feature may be implemented in the following manner: performing frequency domain transform based on a plurality of sample points included in the low-frequency subband signal to obtain transform coefficients respectively corresponding to the plurality of sample points; performing spectral band replication on the last half of transform coefficients respectively corresponding to the plurality of sample points to obtain reference transform coefficients of a reference high-frequency subband signal; amplifying the reference transform coefficients of the reference high-frequency subband signal based on a subband spectral envelope corresponding to the high-frequency feature to obtain amplified reference transform coefficients; and performing inverse frequency domain transform (namely, inverse transform of frequency domain transform) on the amplified reference transform coefficients to obtain the high-frequency subband signal corresponding to the high-frequency feature.

A frequency domain transform method in some embodiments includes modified discrete cosine transform (MDCT), discrete cosine transform (DCT), and fast Fourier transform (FFT). A frequency domain transform manner is not limited herein.

In some embodiments, the amplifying the reference transform coefficients of the reference high-frequency subband signal based on the subband spectral envelope corresponding to the high-frequency feature to obtain the amplified reference transform coefficients may be implemented in the following manner: dividing the reference transform coefficients of the reference high-frequency subband signal into a plurality of subbands based on the subband spectral envelope corresponding to the high-frequency feature; and performing the following processing on any one of the plurality of subbands: determining first average energy corresponding to the subband in the subband spectral envelope, and determining second average energy corresponding to the subband; determining an amplification factor based on a ratio of the first average energy to the second average energy; and multiplying the amplification factor with each reference transform coefficient included in the subband to obtain the amplified reference transform coefficients.

In an example, MDCT transform for 640 points similar to that on the encoder side is also performed on the low-frequency subband signal $x'_{LB}(n)$ generated on the decoder side to generate MDCT coefficients for 320 points (namely, MDCT coefficients for a low-frequency part). To be specific, frequency domain transform is performed based on the plurality of sample points included in the low-frequency subband signal to obtain the transform coefficients respectively corresponding to the plurality of sample points.

Then the MDCT coefficients, generated based on $x'_{LB}(n)$, for the 320 points are copied to generate MDCT coefficients for a high-frequency part (to be specific, the reference transform coefficients of the reference high-frequency subband signal). With reference to a basic feature of a speech signal, the low-frequency part has more harmonics, and the high-frequency part has less harmonics. Therefore, to prevent simple replication from causing excessive harmonics in a manually generated MDCT spectrum for the high frequency part, the last 160 points, in the MDCT coefficients for the 320 points, on which the low-frequency subband signal depends may serve as a master copy, and the spectrum is copied twice to generate reference values of MDCT coefficients of the reference high-frequency subband signal for 320 points (namely, the reference transform coefficients for the reference high-frequency subband signal). To be specific, spectral band replication is performed on the last half of the transform coefficients respectively corresponding to the plurality of sample points to obtain the reference transform coefficients of the reference high-frequency subband signal.

Then the previously obtained eight subband spectral envelopes (namely, the eight subband spectral envelopes obtained through lookup of the quantization table, namely, the subband spectral envelope corresponding to the high-frequency feature) are called. The eight subband spectral envelopes correspond to eight high-frequency subbands. The generated reference values of the MDCT coefficients of the reference high-frequency subband signal for 320 points are divided into eight reference high-frequency subbands (to be specific, the reference transform coefficients of the reference high-frequency subband signal are divided into a plurality of subbands). The following processing is performed on each high-frequency subband: Amplification control (multiplication in frequency domain) is performed on the generated reference values of the MDCT coefficients of the reference high-frequency subband signal for 320 points based on a high-frequency subband and a corresponding reference high-frequency subband. For example, an amplification factor is calculated based on average energy (namely, the first average energy) of the high-frequency subband and average energy (the second average energy) of the corresponding reference high-frequency subband. An MDCT coefficient corresponding to each point in the corresponding reference high-frequency subband is multiplied by the amplification factor to ensure that energy of a virtual high-frequency MDCT coefficient generated during decoding is close to that of an original coefficient on the encoder side.

For example, it is assumed that average energy of a high-frequency subband, generated through replication, of the reference high-frequency subband signal is Y_L, and average energy of a current high-frequency subband on which amplification control is performed (namely, a high-frequency subband corresponding to a subband spectral envelope obtained by decoding the bitstream) is Y_H. In this case, an amplification factor is calculated as follows: a=sqrt (Y_H/Y_L). After the amplification factor a is obtained, each point, generated through replication, in the reference high-frequency subband is directly multiplied by a.

Finally, inverse MDCT transform is called to generate an estimated value $x'_{HB}(n)$ (namely, the high-frequency subband signal corresponding to the high-frequency feature) of the high-frequency subband signal. Inverse MDCT transform is performed on amplified MDCT coefficients for 320 points to generate estimated values for 640 points. Through overlapping, estimated values of the first 320 valid points are used as $x'_{HB}(n)$.

In step 204, subband synthesis is performed on the low-frequency subband signal and the high-frequency subband signal to obtain a synthetic audio signal corresponding to the low-frequency bitstream and the high-frequency bitstream.

For example, the subband synthesis is an inverse process of subband decomposition, and the decoder side performs subband synthesis on the low-frequency subband signal and the high-frequency subband signal to restore the audio signal, where the synthetic audio signal is a restored audio signal.

In some embodiments, the performing subband synthesis on the low-frequency subband signal and the high-frequency subband signal to obtain the synthetic audio signal corresponding to the low-frequency bitstream and the high-frequency bitstream may be implemented in the following manner: upsampling the low-frequency subband signal to obtain a low-pass filtered signal; upsampling the high-frequency subband signal to obtain a high-pass filtered signal; and performing filtering synthesis on the low-pass filtered signal and the high-pass filtered signal to obtain a synthetic audio signal.

For example, after the low-frequency subband signal and the high-frequency subband signal are obtained, subband synthesis is performed on the low-frequency subband signal and the high-frequency subband signal through a QMF synthesis filter to restore the audio signal.

The following describes exemplary application of embodiments in a real application scenario.

Some embodiments may be applied to various audio scenarios, for example, a voice call or instant messaging. The voice call is used below as an example for description.

A principle of speech encoding in the related art is generally as follows: During speech encoding, speech waveform samples can be directly encoded sample by sample. Alternatively, related low-dimensionality features are extracted according to a vocalism principle of humans, an encoder encodes these features, and a decoder reconstructs a speech signal based on these parameters.

The foregoing encoding principles are derived from speech signal modeling, namely, a compression method based on signal processing. Compared with the compression method based on signal processing, to improve encoding efficiency while ensuring speech quality. Some embodiments provide a speech codec method (namely, an audio processing method) based on subband decomposition and a neural network. A speech signal with a specific sampling rate is decomposed into a low-frequency subband signal and a high-frequency subband signal based on features of a speech signal. Different subband signals may be compressed by using different data compression mechanisms. For an important part (the low-frequency subband signal), a feature vector with lower dimensionality than that of an input low-frequency subband signal is obtained through processing based on a neural network (NN) technology. For a less important part (the high-frequency subband signals), fewer bits are used for encoding.

Figure 6:
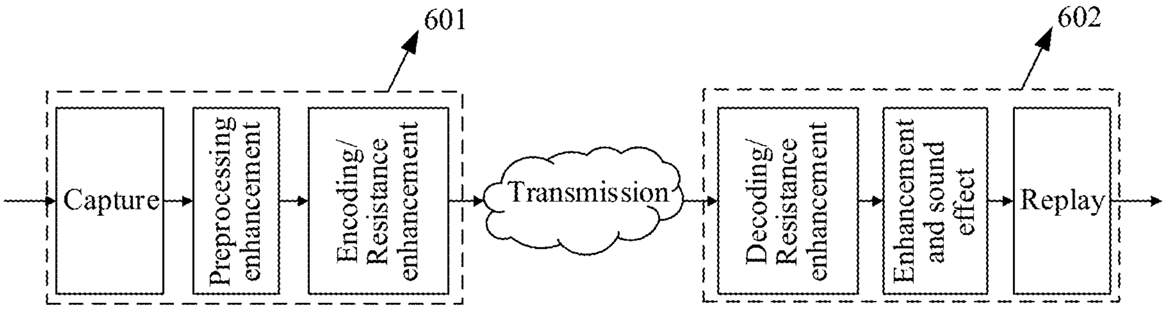
FIG. 6 is a schematic diagram of an end-to-end speech communication link according to some embodiments.

Some embodiments may be applied to a speech communication link shown in FIG. 6. A Voice over Internet Protocol (VOIP) conference system is used as an example. A voice codec technology used in some embodiments is deployed in an encoding part and a decoding part to provide basic functions of speech compression. An encoder is deployed on an uplink client 601, and a decoder is deployed on a downlink client 602. The uplink client captures speech, performs preprocessing, enhancement, encoding, and the like, and transmits an encoded bitstream to the downlink client 602 through a network. The downlink client 602 performs decoding, enhancement, and the like to replay decoded speech on the downlink client 602.

Considering forward compatibility (to be specific, a new encoder is compatible with an existing encoder), a transcoder needs to be deployed in the system background (to be specific, on a server) to support interworking between the new encoder and the existing encoder. For example, in a case that a transmit end (the uplink client) is a new NN encoder and a receive end (the downlink client) is a public switched telephone network (PSTN) (G.722), in the background, an NN decoder needs to run to generate a speech signal, and then a G.722 encoder is called to generate a specific bitstream to implement a transcoding function. In this way, the receive end can correctly perform decoding based on the specific bitstream.

A speech codec method based on subband decomposition and a neural network in some embodiments is described below with reference to FIG. 7.

The following processing is performed on an encoder side: An input speech signal x(n) of an $n^{th}$ frame is decomposed into a low-frequency subband signal $x_{LB}(n)$ and a high-frequency subband signal $x_{HB}(n)$ by using an analysis filter. For the low-frequency subband signal $x_{LB}(n)$, a first NN is called to obtain a low-dimensionality feature vector $F_{LB}(n)$. Dimensionality of the feature vector $F_{LB}(n)$ is lower than that of the low-frequency subband signal. In this way, an amount of data is reduced. For example, for each frame $x_{LB}(n)$, a dilated convolutional network (dilated CNN) is called to generate a feature vector $F_{LB}(n)$ with lower dimensionality. Other NN structures are not limited herein. For example, an autoencoder, a fully connected (FC) network, a long short-term memory (LSTM) network, or a combination of a convolutional neural network (CNN) and LSTM may be used.

For the high-frequency subband signal $x_{HB}(n)$, considering that a high frequency is less important to quality than a low frequency, other solutions may be used to extract a feature vector $F_{HB}(n)$ for the high-frequency subband signal $x_{HB}(n)$. For example, in a bandwidth extension technology based on speech signal analysis, a high-frequency subband signal can be generated at a bitrate of only 1 to 2 kbps, and an NN structure same as that used for the low-frequency subband signal or a simpler network (for example, an output feature vector is smaller than the low-frequency feature vector $F_{LB}(n)$) may be used.

Vector quantization or scalar quantization is performed on a feature vector (namely, $F_{LB}(n)$ and $F_{HB}(n)$) corresponding to a subband. Entropy encoding is performed on an index value obtained through quantization, and an encoded bitstream is transmitted to a decoder side.

The following processing is performed on the decoder side: A bitstream received on the decoder side is decoded to obtain an estimated value $F_{LB}$ (n) of a low-frequency feature vector and an estimated value $F_{HB}$ (n) of a high-frequency feature vector. For a low-frequency part, based on the estimated value $F_{LB}$ (n) of the low-frequency feature vector, a second NN is called to generate an estimated value $x_{LB}$ (n) of a low-frequency subband signal. For a high-frequency part, based on the estimated value $F_{HB}$ (n) of the high-frequency feature vector, high-frequency reconstruction is called to generate an estimated value $x_{HB}$ (n) of a high-frequency subband signal. Finally, a QMF synthesis filter is called to generate a reconstructed speech signal x'(n).

QMF filters, a dilated convolutional network, and a bandwidth extension technology are described below before the speech codec method based on subband decomposition and a neural network in some embodiments is described.

Figure 8:
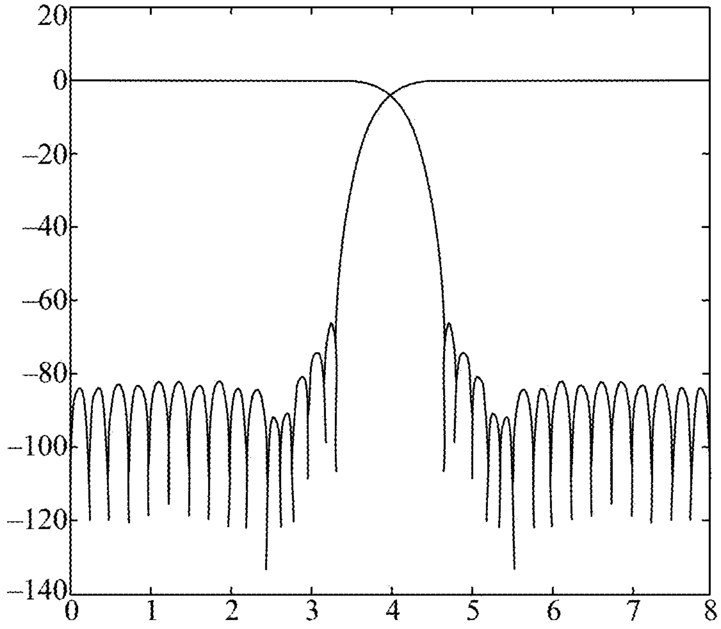
FIG. 8 is a schematic diagram of filters according to some embodiments.

The QMF filters are a filter pair that includes analysis and synthesis. For the QMF analysis filter, an input signal with a sampling rate of Fs may be decomposed into two signals with a sampling rate of Fs/2, which represent a QMF low-pass signal and a QMF high-pass signal respectively. FIG. 8 shows spectral response for a low-pass part H_Low (z) and a high-pass part H_High(z) of a QMF filter. Based on related theoretical knowledge of QMF analysis filters, correlation between a low-pass filter coefficient and a high-pass filter coefficient can be easily described, as shown in a formula (1):

$$h_{High}(k) = -1^k h_{Low}(k) \tag{1}$$

$h_{Low}$ (k) indicates a low-pass filter coefficient, and $h_{High}$ (k) indicates a high-pass filter coefficient.

Similarly, according to a QMF related theory, QMF synthesis filters may be described based on the QMF analysis filters H_Low(z) and H_High(z), as shown in a formula (2):

$$G_{Low}(z) = H_{Low}(z) \tag{2}$$

-continued $$G_{High}(z)=(-1)*H_{High}(z)$$

$G_{Low}(z)$ indicates a restored low-pass signal, and $G_{High}(z)$ indicates a restored high-pass signal.

A reconstructed signal, with a sampling rate of Fs, that corresponds to the input signal may be restored through synthesis performed by QMF synthesis filters on the low-pass signal and the high-pass signal that are restored on a decoder side.

Figure 9A:
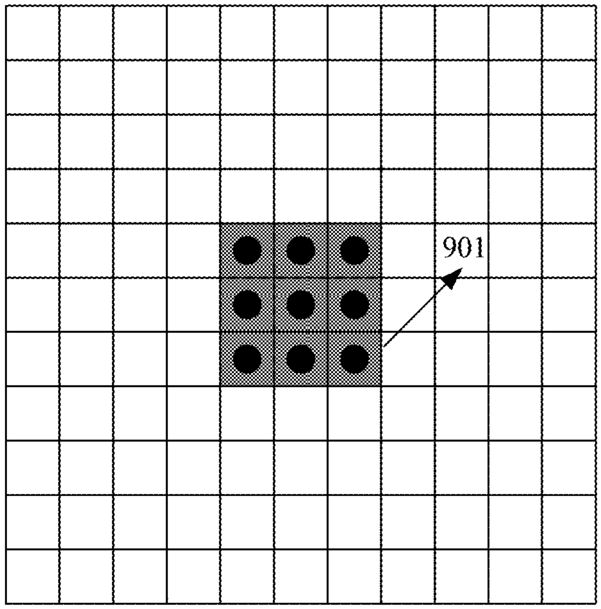
FIG. 9A is a schematic diagram of a common convolutional network according to some embodiments.
Figure 9B:
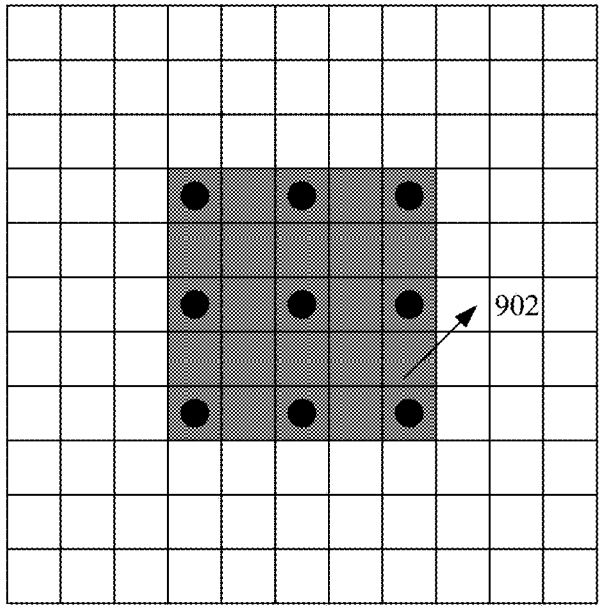
FIG. 9B is a schematic diagram of a dilated convolutional network according to some embodiments.

FIG. 9A is a schematic diagram of a common convolutional network according to some embodiments. FIG. 9B is a schematic diagram of a dilated convolutional network according to some embodiments. Compared with the common convolutional network, dilated convolution can expand a receptive field while keeping a size of a feature map unchanged, and can also avoid errors caused by upsampling and downsampling. Kernel sizes shown in FIG. 9A and FIG. 9B are both 3×3. However, a receptive field 901 for common convolution in FIG. 9A is only 3, while a receptive field 902 for dilated convolution in FIG. 9B reaches 5. To be specific, for a convolution kernel with a size of 3×3, the receptive field for common convolution in FIG. 9A is 3, and a dilation rate (the number of intervals between points in the convolution kernel) is 1; and the receptive field for dilated convolution in FIG. 9B is 5, and a dilation rate is 2.

The convolution kernel may be further shifted on a plane similar to that shown in FIG. 9A or FIG. 9B. Herein, a concept of stride rate (step) is used. For example, the convolution kernel is shifted by 1 grid each time. In this case, a corresponding stride rate is 1.

In addition, a concept of convolution channel quantity is further used, which indicates the number of convolution kernels whose parameters are to be used for convolutional analysis. Theoretically, a larger number of channels results in more comprehensive analysis of a signal and higher accuracy. However, a larger number of channels also leads to higher complexity. For example, a 24-channel convolution operation may be used for a 1×320 tensor, and a 24×320 tensor is outputted.

The kernel size (for example, for a speech signal, the kernel size may be set to 1×3), the dilation rate, the stride rate, and the channel quantity for dilated convolution may be defined according to a practical application requirement. This is not specifically limited herein.

Figure 10:
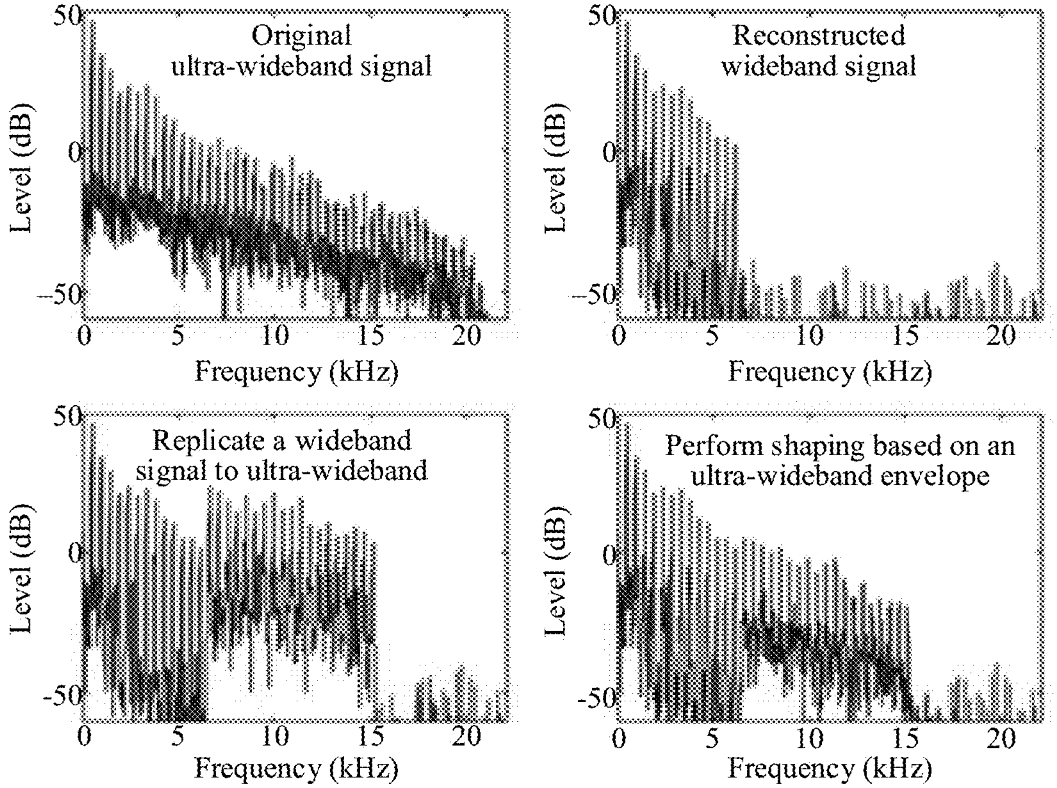
FIG. 10 is a schematic diagram of bandwidth extension according to some embodiments.

In a diagram of bandwidth extension (or spectral band replication) shown in FIG. 10, a wideband signal is first reconstructed. Then the wideband signal is replicated to an ultra-wideband signal. Finally, shaping is performed based on an ultra-wideband envelope. A frequency-domain implementation solution shown in FIG. 10 specifically includes the following steps: (1) Core layer encoding is implemented at a low sampling rate. (2) A spectrum of a low frequency part is selected and replicated to a high frequency. (3) Amplification control is performed on a replicated high-frequency spectrum based on pre-recorded boundary information (which describes correlation between high frequency energy and low frequency energy, and the like). A sampling rate can be doubled at a bitrate of only 1 to 2 kbps.

The speech codec method based on subband decomposition and a neural network in some embodiments is described below in detail.

In some embodiments, a speech signal with a sampling rate Fs of 32,000 Hz is used as an example. (the method provided in some embodiments is also applicable to scenarios with other sampling rates, including but not limited to 8,000 Hz, 32,000 Hz, and 48,000 Hz). In addition, assuming that a frame length is set to 20 ms, Fs=32000 Hz is equivalent to that each frame includes 640 sample points.

Figure 7:
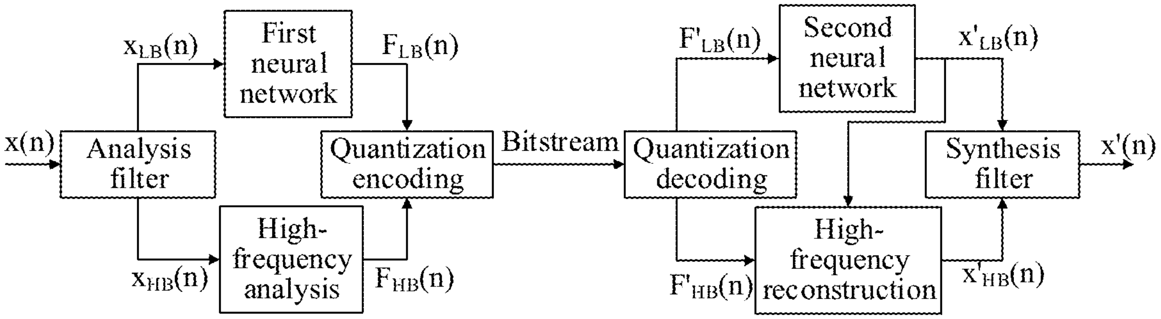
FIG. 7 is a schematic flowchart of a speech codec method based on subband decomposition and a neural network according to some embodiments.

With reference to a diagram of a principle shown in FIG. 7, detailed descriptions are provided for an encoder side and a decoder side. First, an encoding principle on the encoder side is described.

First, an input signal is generated.

For a speech signal with a sampling rate Fs of 32,000 Hz, an input signal of an $n^{th}$ frame includes 640 sample points, and is denoted as an input signal x(n).

Then QMF signal decomposition is performed.

A QMF analysis filter (two-channel QMF) is called for downsampling. Two subband signals may be obtained: a low-frequency subband signal $x_{LB}(n)$ and a high-frequency subband signal $x_{HB}(n)$. Effective bandwidth for the low-frequency subband signal $x_{LB}(n)$ and the high-frequency subband signal $x_{HB}(n)$ is 0-8 kHz and 8-16 kHz respectively. The low-frequency subband signal $x_{LB}(n)$ and the high-frequency subband signal $x_{HB}(n)$ each have 320 sample points.

Further, the low-frequency subband signal $x_{LB}(n)$ is input to a first NN for data compression.

The first NN is called based on the low-frequency subband signal $x_{LB}(n)$ to generate a feature vector $F_{LB}(n)$ with lower dimensionality. Dimensionality of $x_{LB}(n)$ is 320, and dimensionality of $F_{LB}(n)$ is 56. From the perspective of a data amount, the first NN implements functions of "dimensionality reduction" and data compression.

With reference to the diagram of the network structure of the first NN in FIG. 11, a process of data compression by the first NN is described in detail below.

24-channel causal convolution is called to expand an input tensor (namely, vector) to be a 24×320 tensor. The 24×320 tensor is preprocessed. For example, a pooling operation with a factor of 2 and an activation function of ReLU is performed on the 24×320 tensor to generate a 24×160 tensor.

Three encoding blocks with different downsampling factors (Down_factor) are concatenated. An encoding block with a Down_factor of 4 is used as an example. One or more dilated convolutions may be first performed. Each convolution kernel has a fixed size of 1×3, and a stride rate is 1. In addition, dilation rates of the one or more dilated convolutions may be set according to a requirement, for example, may be 3. Certainly, dilation rates of different dilated convolutions are not limited herein.

Down_factors of the three encoding blocks are set to 4, 5, and 8. This is equivalent to setting pooling factors with different values for downsampling. Channel quantities for the three encoding blocks are set to 48, 96, and 192. The 24×160 tensor is converted into a 48×40 tensor, a 96×8 tensor, and a 192×1 tensor sequentially after passing through the three encoding blocks. Causal convolution similar to preprocessing may be further performed on the 192×1 tensor to output a 56-dimensional feature vector $F_{LB}(n)$.

Still refer to FIG. 7. Further, high-frequency analysis is performed on the high-frequency subband signal $x_{HB}(n)$. The high-frequency analysis is intended to extract key information of the high-frequency subband signal $x_{HB}(n)$ and generate a feature vector $F_{HB}(n)$ with lower dimensionality.

In some embodiments, another NN structure similar to the first NN may be introduced to generate low-dimensionality feature vectors. Compared with the low-frequency subband signal, the high-frequency subband signal are less important to quality. Therefore, a structure of an NN for the high-frequency subband signal may not be as complex as that of the first NN. The NN structure for the high-frequency subband signal in FIG. 12 is similar to the structure of the first NN, but has much fewer channels than that of the first NN.

However, for the high-frequency subband signal, although a data amount of the high-frequency subband signal is greatly reduced (from 320 dimensions to 8 dimensions) through the NN structure shown in FIG. 12, model complexity of the NN structure is not optimal. Therefore, some embodiments provide another method for compressing a high-frequency subband signal: bandwidth extension (a wideband speech signal is restored from a narrowband speech signal with a limited frequency band). Application of bandwidth extension in embodiments is described below in detail.

Modified discrete cosine transform (MDCT) is called for a high-frequency subband signal $x_{HB}(n)$ including 320 points to generate MDCT coefficients for the 320 points. Specifically, in the case of 50% overlapping, an $(n+1)^{th}$ frame of high-frequency data and an $n^{th}$ frame of high-frequency data may be combined (spliced), and MDCT is performed for 640 points to obtain the MDCT coefficients for the 320 points.

The MDCT coefficients for the 320 points are divided into N subbands. The subband herein combines a plurality of adjacent MDCT coefficients into a group, and the MDCT coefficients for the 320 points may be divided into eight subbands. For example, the 320 points may be evenly allocated, in other words, each subband includes a same quantity of points. Certainly, in some embodiments, the 320 points may alternatively be divided unevenly. For example, a lower-frequency subband includes fewer MDCT coefficients (with a higher frequency resolution), and a higher-frequency subband includes more MDCT coefficients (with a lower frequency resolution).

According to the Nyquist sampling theorem (to restore an original signal from a sampled signal without distortion, a sampling frequency needs to be greater than 2 times the highest frequency of the original signal, and when a sampling frequency is less than 2 times the highest frequency of a spectrum, spectra of signals overlap, or when a sampling frequency is greater than 2 times the highest frequency of the spectrum, spectra of signals do not overlap), the MDCT coefficients for the 320 points represent a spectrum of 8-16 kHz. However, UWB speech communication does not necessarily require a spectrum of 16 kHz. For example, if a spectrum is set to 14 kHz, only MDCT coefficients for the first 240 points need to be considered, and correspondingly, a quantity of subbands may be controlled to be 6.

For each subband, average energy of all MDCT coefficients in the current subband is calculated as a subband spectral envelope (the spectral envelope is a smooth curve passing through principal peak points of a spectrum). For example, the MDCT coefficients included in the current subband are x(n), where n=1, 2, . . . , 40. In this case, average energy is as follows: $Y=((x(1)^2+x(2)^2+ \ldots +x(40)^2)/40)$. In a case that MDCT coefficients for the 320 points are divided into eight subbands, eight subband spectral envelopes may be obtained. The eight subband spectral envelopes are a generated feature vector $F_{HB}(n)$ of the high-frequency subband signal.

To sum up, in either of the foregoing methods (NN structure and bandwidth extension), a 320-dimensional high-frequency subband signal can be output as an 8-dimensional feature vector. Therefore, high-frequency information can be represented by only a small amount of data. This significantly improves encoding efficiency.

Still refer to FIG. 7. Finally, quantization encoding is performed.

Scalar quantization (each component is quantized separately) and entropy encoding may be performed on the feature vector $F_{LB}(n)$ of the low-frequency subband signal and the feature vector $F_{HB}(n)$ of the high-frequency subband signal. In addition, a combination of the vector quantization (a plurality of adjacent components are combined into a vector for joint quantization) and entropy encoding technologies is not limited herein. After quantization encoding is performed on the feature vector, a corresponding bitstream may be generated. Based on experiments, high-quality compression can be implemented for a 32 kHz ultra-wideband signal at a bitrate of only 6 to 10 kbps.

Still refer to FIG. 7. A decoding principle on the decoder side is as follows:

First, quantization decoding is performed.

The quantization decoding is an inverse process of quantization encoding. In a case that a bitstream is received, entropy decoding is first performed. Through lockup of a quantization table, an estimated value $F'_{LB}(n)$ of a low-frequency feature vector and an estimated value $F'_{HB}(n)$ of a high-frequency feature vector are obtained.

Then the estimated value $F'_{LB}(n)$ of the low-frequency feature vector is input to a second NN.

Based on the estimated value $F'_{LB}(n)$ of the low-frequency feature vector, a second NN shown in FIG. 13 is called to generate an estimated value $x'_{LB}(n)$ of the low-frequency subband signal. The second NN is similar to the first NN. For example, a structure of post-processing in causal convolution and the second NN is similar to preprocessing in the first NN. A structure of a decoding block is symmetric with that of an encoding block on the encoder side. This is specifically manifested in the following aspects: For the encoding block on the encoder side, dilated convolution is first perform, and then pooling and downsampling are performed. For the decoding block on the decoder side, pooling is first performed, and then upsampling and dilated convolution are performed.

Then high-frequency reconstruction is performed on the estimated value $F'_{HB}(n)$ of the high-frequency feature vector.

Similar to the high-frequency analysis on the encoder side, the high-frequency reconstruction in some embodiments includes two solutions.

A first implementation of the high-frequency reconstruction corresponds to the first implementation (corresponding to the NN structure shown in FIG. 12) of the high-frequency analysis on the encoder side. Based on the estimated value $F'_{HB}(n)$ of the high-frequency feature vector, a deep neural network model is called to generate an estimated value $x'_{HB}(n)$ of the high-frequency subband signal.

A structure of the deep neural network is similar to that in the first implementation of the high-frequency analysis (shown in FIG. 12). For example, structures of causal convolution and post-processing are similar to that of preprocessing in the first implementation of the high-frequency analysis. A structure of a decoding block is symmetric with that of an encoding block on the encoder side. For the encoding block on the encoder side, dilated convolution is first perform, and then pooling and downsampling are performed. For the decoding block on the decoder side, pooling is first performed, and then upsampling and dilated convolution are performed.

A second implementation of the high-frequency reconstruction corresponds to the second implementation (corresponding to the bandwidth extension technology) of the high-frequency analysis on the encoder side. The following operations are performed based on eight subband spectral envelopes obtained by decoding the bitstream, namely, the estimated value $F'_{HB}(n)$ of the high-frequency feature vector: MDCT transform for 640 points similar to that on the encoder side is also performed on the estimated value $x'_{LB}(n)$ of the low-frequency subband signal generated on the decoder side to generate MDCT coefficients for 320 points (namely, MDCT coefficients for a low-frequency part). The MDCT coefficients, generated based on $x'_{LB}(n)$, for the 320 points are copied to generate MDCT coefficients for a high-frequency part.

With reference to a basic feature of a speech signal, the low-frequency part has more harmonics, and the high-frequency part has less harmonics. Therefore, to prevent simple replication from causing excessive harmonics in a manually generated MDCT spectrum for the high frequency part, the last 160 points, in the MDCT coefficients for the 320 points, on which the low-frequency subband depends may serve as a master copy, and the spectrum is copied twice to generate reference values of MDCT coefficients of the high-frequency subband signal for 320 points.

The previously obtained eight subband spectral envelopes (namely, the eight subband spectral envelopes obtained through lookup of the quantization table) are called. The eight subband spectral envelopes correspond to eight high-frequency subbands. The generated reference values of the MDCT coefficients of the high-frequency subband signal for 320 points are divided into eight reference high-frequency subbands. The following processing is performed on each high-frequency subband: Amplification control (multiplication in frequency domain) is performed on the generated reference values of the MDCT coefficients of the high-frequency subband signal for 320 points based on a high-frequency subband and a corresponding reference high-frequency subband.

For example, an amplification factor is calculated based on average energy of the high-frequency subband and average energy of the corresponding reference high-frequency subband. An MDCT coefficient corresponding to each point in the corresponding reference high-frequency subband is multiplied by the amplification factor to ensure that energy of a virtual high-frequency MDCT coefficient generated during decoding is close to that of an original coefficient on the encoder side.

For example, it is assumed that average energy of a high-frequency subband, generated through replication, of the high-frequency subband signal is Y_L, and average energy of a current high-frequency subband on which amplification control is performed (namely, a high-frequency subband corresponding to a subband spectral envelope obtained by decoding the bitstream) is Y_H. In this case, an amplification factor is calculated as follows: a=sqrt(Y_H/Y_L). After the amplification factor a is obtained, each point, generated through replication, in the high-frequency subband is directly multiplied by a. Finally, inverse MDCT transform is called to generate an estimated value $x'_{HB}(n)$ of the high-frequency subband signal. Inverse MDCT transform is performed on amplified MDCT coefficients for 320 points to generate estimated values for 640 points. Through overlapping, estimated values of the first 320 valid points are used as $x'_{HB}(n)$.

Still refer to FIG. 7. Finally, a synthesis filter is called.

After the estimated value $x'_{LB}(n)$ of the low-frequency subband signal and the estimated value $x'_{HB}(n)$ of the high-frequency subband signal are obtained on the decoder side, upsampling may be performed, and the QMF synthesis filter may be called to generate a reconstructed signal $x'(n)$ including 640 points.

In some embodiments, data may be captured for joint training on related networks on an encoder side and a decoder side, to obtain an optimal parameter. A user only needs to prepare data and set a corresponding network structure. After training is completed in the background, a trained model can be put into use.

To sum up, in the speech codec method based on subband decomposition and a neural network in some embodiments, signal decomposition, a signal processing technology, and the deep neural network are integrated to significantly improve encoding efficiency compared with a signal processing solution in the related art, while ensuring audio quality and acceptable complexity.

The audio processing method provided in some embodiments is described with reference to the exemplary application and implementation of the terminal device. Some embodiments further provide an audio processing apparatus. In some embodiments, functional modules in the audio processing apparatus may be cooperatively implemented by hardware resources of an electronic device (for example, a terminal device, a server, or a server cluster), for example, computing resources such as a processor, communication resources (for example, being used for supporting various types of communication such as optical cable communication and cellular communication), and a memory. FIG. 3A and FIG. 3B show an audio processing device 555 stored in a memory 550. The apparatus may be software in the form of a program or plug-in, for example, a software module designed by using C/C++, Java, or other programming languages, application software designed by using C/C++, Java, or other programming languages, or a dedicated software module, an application programing interface, a plug-in, a cloud service, or the like in a large software system. The following describes different implementations by using examples.

The audio processing apparatus 555 shown in FIG. 3A includes a series of modules, including a decomposition module 5551, a feature extraction module 5552, a high-frequency analysis module 5553, and an encoding module 5554. The following further describes how the modules in the audio processing apparatus 555 provided in some embodiments cooperate with each other to implement an audio encoding solution.

The decomposition module is configured to perform subband decomposition on an audio signal to obtain a low-frequency subband signal and a high-frequency subband signal of the audio signal. The feature extraction module is configured to perform feature extraction on the low-frequency subband signal to obtain a low-frequency feature of the low-frequency subband signal. The high-frequency analysis module is configured to perform high-frequency analysis on the high-frequency subband signal to obtain a high-frequency feature of the high-frequency subband signal, feature dimensionality of the high-frequency feature being lower than that of the low-frequency feature. The encoding module is configured to perform quantization encoding on the low-frequency feature to obtain a low-frequency bitstream of the audio signal, and perform quantization encoding on the high-frequency feature to obtain a high-frequency bitstream of the audio signal.

In some embodiments, the decomposition module is further configured to: sample the audio signal to obtain a sampled signal, the sampled signal including a plurality of sample points obtained through sampling; perform low-pass filtering on the sampled signal to obtain a low-pass filtered signal; downsample the low-pass filtered signal to obtain the low-frequency subband signal of the audio signal; perform high-pass filtering on the sampled signal to obtain a high-pass filtered signal; and downsample the high-pass filtered signal to obtain the high-frequency subband signal of the audio signal.

In some embodiments, the feature extraction module is further configured to: perform convolution on the low-frequency subband signal to obtain a convolution feature of the low-frequency subband signal; perform pooling on the convolution feature to obtain a pooling feature of the low-frequency subband signal; downsample the pooling feature to obtain a downsampling feature of the low-frequency subband signal; and perform convolution on the downsampling feature to obtain the low-frequency feature of the low-frequency subband signal.

In some embodiments, the downsampling is implemented through a plurality of concatenated encoding layers; and the feature extraction module is further configured to downsample the pooling feature through the first encoding layer of the plurality of concatenated encoding layers; output a downsampling result of the first encoding layer to a subsequent concatenated encoding layer, and continue to perform downsampling and output a downsampling result through the subsequent concatenated encoding layer, until the last encoding layer performs output; and use a downsampling result outputted by the last encoding layer as the downsampling feature of the low-frequency subband signal.

In some embodiments, the high-frequency analysis module is further configured to: call a first neural network model to perform feature extraction on the high-frequency subband signal through the first neural network model to obtain the high-frequency feature of the high-frequency subband signal; or perform bandwidth extension on the high-frequency subband signal to obtain the high-frequency feature of the high-frequency subband signal.

In some embodiments, the high-frequency analysis module is further configured to: perform frequency domain transform based on a plurality of sample points included in the high-frequency subband signal to obtain transform coefficients respectively corresponding to the plurality of sample points; divide the transform coefficients respectively corresponding to the plurality of sample points into a plurality of subbands; perform mean processing on a transform coefficient included in each subband to obtain average energy corresponding to each subband, and use the average energy as a subband spectral envelope corresponding to each subband; and determine subband spectral envelopes respectively corresponding to the plurality of subbands as the high-frequency feature of the high-frequency subband signal.

In some embodiments, the high-frequency analysis module is further configured to: obtain a reference high-frequency subband signal of a reference audio signal, the reference audio signal being an audio signal adjacent to the audio signal; and perform, based on a plurality of sample points included in the reference high-frequency subband signal and the plurality of sample points included in the high-frequency subband signal, discrete cosine transform on the plurality of sample points included in the high-frequency subband signal to obtain the transform coefficients respectively corresponding to the plurality of sample points included in the high-frequency subband signal.

In some embodiments, the high-frequency analysis module is further configured to: determine a sum of squares of transform coefficients corresponding to sample points included in each subband; and determine a ratio of the sum of squares to a quantity of sample points included in the subband as the average energy corresponding to each subband.

In some embodiments, the encoding module is further configured to: quantize the low-frequency feature to obtain an index value of the low-frequency feature; perform entropy encoding on the index value of the low-frequency feature to obtain the low-frequency bitstream of the audio signal; and the performing quantization encoding on the high-frequency feature to obtain a high-frequency bitstream of the audio signal includes: quantizing the high-frequency feature into an index value of the high-frequency feature; and performing entropy encoding on the index value of the high-frequency feature to obtain the high-frequency bitstream of the audio signal.

The audio processing apparatus 555 shown in FIG. 3B includes a series of modules, including a decoding module 5555, a feature reconstruction module 5556, a high-frequency reconstruction module 5557, and a synthesis module 5558. The following further describes how the modules in the audio processing apparatus 555 provided in various embodiments cooperate with each other to implement an audio decoding solution.

The decoding module is configured to perform quantization decoding on a low-frequency bitstream to obtain a low-frequency feature corresponding to the low-frequency bitstream, and perform quantization decoding on a high-frequency bitstream to obtain a high-frequency feature corresponding to the high-frequency bitstream, the low-frequency bitstream and the high-frequency bitstream being obtained by encoding subband signals that are obtained through subband decomposition on an audio signal, and feature dimensionality of the high-frequency feature being lower than that of the low-frequency feature.

The feature reconstruction module is configured to perform feature reconstruction on the low-frequency feature to obtain a low-frequency subband signal corresponding to the low-frequency feature.

The high-frequency reconstruction module is configured to perform high-frequency reconstruction on the high-frequency feature to obtain a high-frequency subband signal corresponding to the high-frequency feature.

The synthesis module is configured to perform subband synthesis on the low-frequency subband signal and the high-frequency subband signal to obtain a synthetic audio signal corresponding to the low-frequency bitstream and the high-frequency bitstream.

In some embodiments, the feature reconstruction module is further configured to: perform convolution on the low-frequency feature to obtain a convolution feature of the low-frequency feature; upsample the convolution feature to obtain an upsampling feature of the low-frequency feature; perform pooling on the upsampling feature to obtain a pooling feature of the low-frequency feature; and perform convolution on the pooling feature to obtain a low-frequency subband signal corresponding to the low-frequency feature.

In some embodiments, the upsampling is implemented through a plurality of concatenated decoding layers; and the feature reconstruction module is further configured to: upsample the convolution feature through the first decoding layer of the plurality of concatenated decoding layers; output an upsampling result of the first decoding layer to a subsequent concatenated decoding layer, and continue to perform upsampling and output an upsampling result through the subsequent concatenated decoding layer, until the last decoding layer performs output; and use an upsampling result outputted by the last decoding layer as the upsampling feature of the low-frequency feature.

In some embodiments, the high-frequency reconstruction module is further configured to: call a second neural network model to perform feature reconstruction on the high-frequency feature through the second neural network model to obtain the high-frequency subband signal corresponding to the high-frequency feature; or perform inverse processing of bandwidth extension on the high-frequency feature to obtain the high-frequency subband signal corresponding to the high-frequency feature.

In some embodiments, the high-frequency reconstruction module is further configured to: perform frequency domain transform based on a plurality of sample points included in the low-frequency subband signal to obtain transform coefficients respectively corresponding to the plurality of sample points; perform spectral band replication on the last half of transform coefficients respectively corresponding to the plurality of sample points to obtain reference transform coefficients of a reference high-frequency subband signal; amplify the reference transform coefficients of the reference high-frequency subband signal based on a subband spectral envelope corresponding to the high-frequency feature to obtain amplified reference transform coefficients; and perform inverse frequency domain transform on the amplified reference transform coefficients to obtain the high-frequency subband signal corresponding to the high-frequency feature.

In some embodiments, the high-frequency reconstruction module is further configured to: divide the reference transform coefficients of the reference high-frequency subband signal into a plurality of subbands based on the subband spectral envelope corresponding to the high-frequency feature; and perform the following processing on any one of the plurality of subbands: determining first average energy corresponding to the subband in the subband spectral envelope, and determining second average energy corresponding to the subband; determining an amplification factor based on a ratio of the first average energy to the second average energy; and multiplying the amplification factor with each reference transform coefficient included in the subband to obtain the amplified reference transform coefficients.

In some embodiments, the decoding module is further configured to: perform entropy decoding on the low-frequency bitstream to obtain an index value corresponding to the low-frequency bitstream; perform inverse quantization on the index value corresponding to the low-frequency bitstream to obtain the low-frequency feature corresponding to the low-frequency bitstream; perform entropy decoding on the high-frequency bitstream to obtain an index value corresponding to the high-frequency bitstream; and perform inverse quantization on the index value corresponding to the high-frequency bitstream to obtain the high-frequency feature corresponding to the high-frequency bitstream.

In some embodiments, the synthesis module is further configured to: upsample the low-frequency subband signal to obtain a low-pass filtered signal; upsample the high-frequency subband signal to obtain a high-pass filtered signal; and perform filtering synthesis on the low-pass filtered signal and the high-pass filtered signal to obtain a synthetic audio signal.

A person skilled in the art would understand that these "modules" could be implemented by hardware logic, a processor or processors executing computer software code, or a combination of both. The "modules" may also be implemented in software stored in a memory of a computer or a non-transitory computer-readable medium, where the instructions of each module are executable by a processor to thereby cause the processor to perform the respective operations of the corresponding module.

Some embodiments provide a computer program product or a computer program. The computer program product or the computer program includes a computer program or instructions, and the computer program or instructions are stored in a computer-readable storage medium. A processor of an electronic device reads the computer program or instructions from the computer-readable storage medium, and the processor executes the computer program or instructions, so that the electronic device performs the audio processing method in some embodiments.

Some embodiments provide a computer-readable storage medium, having a computer program or instructions stored therein. When the computer program or instructions are executed by a processor, the processor is enabled to perform the audio processing method provided in some embodiments, for example, the audio processing method shown in FIG. 4 and FIG. 5.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the computer program or instructions may be written program or form of a program, software, a software module, a script, or code according to a programming language in any form (including a compiled or interpretive language, or a declarative or procedural language), and may be deployed in any form, including being deployed as a standalone program, or being deployed as a module, a component, a subroutine, or another unit suitable for use in a computing environment.

In some embodiments, the computer program or instructions may be deployed on one computing device for execution, or may be executed on a plurality of computing devices in one location, or may be executed on a plurality of computing devices that are distributed in a plurality of locations and that are interconnected through a communication network.

It may be understood that related data such as user information is involved in embodiments. When some embodiments are applied to a specific product or technology, user permission or consent is required, and collection, use, and processing of related data need to comply with related laws, regulations, and standards in related countries and regions.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. An audio processing method, performed by an electronic device, comprising:

decomposing an audio signal into a low-frequency subband signal and a high-frequency subband signal;

obtaining a low-frequency feature of the low-frequency subband signal, wherein the obtaining the low-frequency feature comprises:

performing convolution on the low-frequency subband signal to obtain a convolution feature of the low-frequency subband signal, and performing pooling on the convolution feature to obtain a pooling feature of the low-frequency subband signal;

obtaining a high-frequency feature of the high-frequency subband signal, wherein a feature dimensionality of the high-frequency feature is lower than a feature dimensionality of the low-frequency feature;

performing quantization encoding on the low-frequency feature to obtain a low-frequency bitstream of the audio signal; and performing quantization encoding on the high-frequency feature to obtain a high-frequency bitstream of the audio signal.

2. The audio processing method according to claim 1, wherein the decomposing comprises:

obtaining a sampled signal of the audio signal, the sampled signal comprising a plurality of sample points obtained through sampling;

performing low-pass filtering on the sampled signal to obtain a low-pass filtered signal;

downsampling the low-pass filtered signal to obtain the low-frequency subband signal of the audio signal;

performing high-pass filtering on the sampled signal to obtain a high-pass filtered signal; and downsampling the high-pass filtered signal to obtain the high-frequency subband signal of the audio signal.

3. The audio processing method according to claim 1, wherein the obtaining the low-frequency feature further comprises:

downsampling the pooling feature to obtain a downsampling feature of the low-frequency subband signal; and performing convolution on the downsampling feature to obtain the low-frequency feature of the low-frequency subband signal.

4. The audio processing method according to claim 3, wherein the downsampling the pooling feature is implemented through a plurality of concatenated encoding layers; and wherein the downsampling the pooling feature comprises:

downsampling the pooling feature through a first encoding layer of the plurality of concatenated encoding layers;

outputting a downsampling result of the first encoding layer to a subsequent concatenated encoding layer, and continuing to perform downsampling and outputting for each subsequent concatenated encoding layer of remaining concatenated encoding layers of the plurality of concatenated encoding layers, until a last encoding layer of the plurality of concatenated encoding layers performs output of the downsampling result; and setting the downsampling result outputted by the last encoding layer as the downsampling feature of the low-frequency subband signal.

5. The audio processing method according to claim 1, wherein the obtaining the high-frequency feature comprises:

a first neural network model to extract the high-frequency feature of the high-frequency subband signal; or performing bandwidth extension on the high-frequency subband signal to obtain the high-frequency feature of the high-frequency subband signal.

6. The audio processing method according to claim 5, wherein the performing the bandwidth extension on the high-frequency subband signal comprises:

performing frequency domain transform based on a plurality of sample points comprised in the high-frequency subband signal to obtain transform coefficients respectively corresponding to the plurality of sample points;

dividing the transform coefficients into a plurality of subbands;

calculating a mean based on the transform coefficients comprised in each subband, setting the mean as an average energy corresponding to each subband, and setting the average energy as a subband spectral envelope corresponding to each subband; and setting subband spectral envelopes respectively corresponding to the plurality of subbands as the high-frequency feature of the high-frequency subband signal.

7. The audio processing method according to claim 6, wherein the performing the frequency domain transform comprises:

obtaining a reference high-frequency subband signal of a reference audio signal, the reference audio signal being another audio signal adjacent to the audio signal; and performing, based on a plurality of sample points comprised in the reference high-frequency subband signal and the plurality of sample points comprised in the high-frequency subband signal, discrete cosine transform on the plurality of sample points comprised in the high-frequency subband signal to obtain the transform coefficients respectively corresponding to the plurality of sample points comprised in the high-frequency subband signal.

8. The audio processing method according to claim 6, wherein the calculating the mean comprises:

determining a sum of squares of the transform coefficients corresponding to the sample points comprised in each subband; and setting a ratio of the sum of squares of the transform coefficients to a quantity of the sample points comprised in each subband as the average energy corresponding to each subband.

9. The audio processing method according to claim 1, wherein the performing the quantization encoding on the low-frequency feature comprises:

quantizing the low-frequency feature into an index value of the low-frequency feature; and performing entropy encoding on the index value of the low-frequency feature to obtain the low-frequency bitstream of the audio signal; and wherein the performing the quantization encoding on the high-frequency feature comprises:

quantizing the high-frequency feature into an index value of the high-frequency feature; and performing entropy encoding on the index value of the high-frequency feature to obtain the high-frequency bitstream of the audio signal.

10. An audio processing apparatus comprising:

at least one memory configured to store program code; and at least one processor configured to read the program code and operate as instructed by the program code, the program code comprising:

decomposition code configured to cause at least one of the at least one processor to decompose an audio signal into a low-frequency subband signal and a high-frequency subband signal;

feature extraction code configured to cause at least one of the at least one processor to:

perform convolution on the low-frequency subband signal to obtain a convolution feature of the low-frequency subband signal;

perform pooling on the convolution feature to obtain a pooling feature of the low-frequency subband signal; and obtain a low-frequency feature of the low-frequency subband signal based on the pooling feature of the low-frequency subband signal;

high-frequency analysis code configured to cause at least one of the at least one processor to obtain a high-frequency feature of the high-frequency subband signal, wherein a feature dimensionality of the high-frequency feature is lower than a feature dimensionality of the low-frequency feature; and encoding code configured to cause at least one of the at least one processor to perform quantization encoding on the low-frequency feature to obtain a low-frequency bitstream of the audio signal, and perform quantization encoding on the high-frequency feature to obtain a high-frequency bitstream of the audio signal.

11. The audio processing apparatus according to claim 10, wherein the decomposition code is further configured to cause at least one of the at least one processor to:

obtain a sampled signal of the audio signal, the sampled signal comprising a plurality of sample points obtained through sampling;

perform low-pass filtering on the sampled signal to obtain a low-pass filtered signal;

downsample the low-pass filtered signal to obtain the low-frequency subband signal of the audio signal;

perform high-pass filtering on the sampled signal to obtain a high-pass filtered signal; and downsample the high-pass filtered signal to obtain the high-frequency subband signal of the audio signal.

12. The audio processing apparatus according to claim 10, wherein the feature extraction code is further configured to cause at least one of the at least one processor to:

downsample the pooling feature to obtain a downsampling feature of the low-frequency subband signal; and perform convolution on the downsampling feature to obtain the low-frequency feature of the low-frequency subband signal.

13. The audio processing apparatus according to claim 12, wherein the downsampling is implemented through a plurality of concatenated encoding layers;

wherein the pooling feature is downsampled through a first encoding layer of the plurality of concatenated encoding layers; and wherein the feature extraction code is further configured to cause at least one of the at least one processor to:

output a downsampling result of the first encoding layer to a subsequent concatenated encoding layer, and continue to perform the downsample and the output for each subsequent concatenated encoding layer of remaining concatenated encoding layers of the plurality of concatenated encoding layers, until a last encoding layer of the plurality of concatenated encoding layers performs output of the downsampling result; and set the downsampling result outputted by the last encoding layer as the downsampling feature of the low-frequency subband signal.

14. The audio processing apparatus according to claim 10, wherein the high-frequency analysis code is further configured to cause at least one of the at least one processor to:

call a first neural network model to extract the high-frequency feature of the high-frequency subband signal; or perform bandwidth extension on the high-frequency subband signal to obtain the high-frequency feature of the high-frequency subband signal.

15. The audio processing apparatus according to claim 14, wherein the high-frequency analysis code is further configured to cause at least one of the at least one processor to:

perform frequency domain transform based on a plurality of sample points comprised in the high-frequency subband signal to obtain transform coefficients respectively corresponding to the plurality of sample points;

divide the transform coefficients into a plurality of subbands;

calculate a mean based on the transform coefficients comprised in each subband, set the mean as an average energy corresponding to each subband, and set the average energy as a subband spectral envelope corresponding to each subband; and set subband spectral envelopes respectively corresponding to the plurality of subbands as the high-frequency feature of the high-frequency subband signal.

16. The audio processing apparatus according to claim 15, wherein the high-frequency analysis code is further configured to cause at least one of the at least one processor to:

obtain a reference high-frequency subband signal of a reference audio signal, the reference audio signal being another audio signal adjacent to the audio signal; and perform, based on a plurality of sample points comprised in the reference high-frequency subband signal and the plurality of sample points comprised in the high-frequency subband signal, discrete cosine transform on the plurality of sample points comprised in the high-frequency subband signal to obtain the transform coefficients respectively corresponding to the plurality of sample points comprised in the high-frequency subband signal.

17. The audio processing apparatus according to claim 15, wherein the high-frequency analysis code is further configured to cause at least one of the at least one processor to:

determine a sum of squares of the transform coefficients corresponding to the sample points comprised in each subband; and set a ratio of the sum of squares of the transform coefficients to a quantity of the sample points comprised in each subband as the average energy corresponding to each subband.

18. The audio processing apparatus according to claim 10, wherein the encoding code is further configured to cause at least one of the at least one processor to:

quantize the low-frequency feature into an index value of the low-frequency feature;

perform entropy encoding on the index value of the low-frequency feature to obtain the low-frequency bitstream of the audio signal;

quantize the high-frequency feature into an index value of the high-frequency feature; and perform entropy encoding on the index value of the high-frequency feature to obtain the high-frequency bitstream of the audio signal.

19. A non-transitory computer-readable storage medium, storing computer code which, when executed by at least one processor, causes the at least one processor to at least:

decompose an audio signal into a low-frequency subband signal and a high-frequency subband signal;

perform convolution on the low-frequency subband signal to obtain a convolution feature of the low-frequency subband signal;

perform pooling on the convolution feature to obtain a pooling feature of the low-frequency subband signal;

obtain a low-frequency feature of the low-frequency subband signal based on the pooling feature of the low-frequency subband signal;

obtain a high-frequency feature of the high-frequency subband signal, wherein a feature dimensionality of the high-frequency feature is lower than a feature dimensionality of the low-frequency feature;

perform quantization encoding on the low-frequency feature to obtain a low-frequency bitstream of the audio signal; and perform quantization encoding on the high-frequency feature to obtain a high-frequency bitstream of the audio signal.

20. The non-transitory computer-readable storage medium according to claim 19, wherein the computer code, when executed by the at least one processor, causes the at least one processor to at least:

obtaining a sampled signal of the audio signal, the sampled signal comprising a plurality of sample points obtained through sampling;

performing low-pass filtering on the sampled signal to obtain a low-pass filtered signal;

downsampling the low-pass filtered signal to obtain the low-frequency subband signal of the audio signal;

performing high-pass filtering on the sampled signal to obtain a high-pass filtered signal; and downsampling the high-pass filtered signal to obtain the high-frequency subband signal of the audio signal.

* * * * *